(12) United States Patent
Overcash et al.

(10) Patent No.: US 8,180,886 B2
(45) Date of Patent: May 15, 2012

(54) METHOD AND APPARATUS FOR DETECTION OF INFORMATION TRANSMISSION ABNORMALITIES

(75) Inventors: Kevin Overcash, Carlsbad, CA (US); Doron Kolton, Pardesia (IL); Rami Mizrahi, Rishon LeZion (IL)

(73) Assignee: TrustWave Holdings, Inc., Chicago, IL (US)

( * ) Notice: Subject to any disclaimer, the term of this patent is extended or adjusted under 35 U.S.C. 154(b) by 99 days.

(21) Appl. No.: 12/270,635

(22) Filed: Nov. 13, 2008

(65) Prior Publication Data
US 2009/0138592 A1 May 28, 2009

Related U.S. Application Data

(60) Provisional application No. 60/988,212, filed on Nov. 15, 2007.

(51) Int. Cl.
G06F 15/16 (2006.01)
(52) U.S. Cl. .................... 709/224; 709/225; 709/227
(58) Field of Classification Search .................. 709/224, 709/225, 227
See application file for complete search history.

(56) References Cited

U.S. PATENT DOCUMENTS

| | | | |
|---|---|---|---|
| 6,351,811 B1 | 2/2002 | Groshon et al. | |
| 7,136,813 B2 * | 11/2006 | Likhachev et al. | 704/240 |
| 7,185,368 B2 | 2/2007 | Copeland, III | |
| 7,313,822 B2 | 12/2007 | Ben-Itzhak | |
| 7,603,458 B1 * | 10/2009 | Sexton et al. | 709/224 |
| 2002/0087882 A1 | 7/2002 | Schneier et al. | |
| 2004/0062199 A1 | 4/2004 | Lau et al. | |
| 2004/0073810 A1 | 4/2004 | Dettinger et al. | |
| 2005/0188079 A1 * | 8/2005 | Motsinger et al. | 709/224 |
| 2005/0203881 A1 | 9/2005 | Sakamoto et al. | |
| 2006/0015941 A1 | 1/2006 | McKenna | |
| 2006/0259973 A1 | 11/2006 | Sima et al. | |
| 2007/0019655 A1 * | 1/2007 | Rodrigo et al. | 370/401 |

FOREIGN PATENT DOCUMENTS
EP 1843564 10/2007

OTHER PUBLICATIONS

International Search Report/Written Opinion issued in PCT/US2007/073974 on Jun. 19, 2008.

(Continued)

Primary Examiner — Djenane Bayard
(74) Attorney, Agent, or Firm — Hanley, Flight & Zimmerman, LLC.

(57) ABSTRACT

In one embodiment, a method for securing a network application is described. The method for securing a network application includes receiving network information within a network application and assigning a probability value to an independent aspect of the network information. The probability value is based on a verification of the independent aspect of the information against a profile of acceptable behavior. The method for securing a network application also includes aggregating the probability values of the independent aspects of the network information to determine the probability of the entire network traffic. In addition, the method for securing a network application includes determining whether the probability value of the entire network information is above or below a threshold probability value. The entire network information is screened out based on the probability value of the entire message with respect to the threshold probability value.

35 Claims, 28 Drawing Sheets

OTHER PUBLICATIONS

BreachGate Sitegrity, "Web Site Security and Availability", Breach Security, Inc. 2005.

BreachView SSL, "Eliminate the SSL Blind Spot in Your IDS", Breach Security, Inc., 2005.

International Search Report/Written Opinion issued in PCT/US07/73996 on May 14, 2008.

U.S. Appl. No. 11/458,965 filed Jul. 20, 2006.

U.S. Appl. No. 11/532,058 filed Sep. 14, 2006.

U.S. Appl. No. 11/532,060 filed Sep. 14, 2006.

U.S. Appl. No. 12/234,303 filed Sep. 19, 2008.

International Search Report and Written Opinion as issued in International Patent Application No. PCT/US2008/083662 on Apr. 29, 2009.

* cited by examiner

Values received during learning period of "parameter value length" test

| Length | # appearances |
|---|---|
| 1 | 100 |
| 2 | 50 |
| 3 | 100 |
| 10 | 1 |
| 1000 | 1 |
| 1001 | 1 |
| 5000 | 100 |
| 5001 | 100 |
| 5005 | 100 |
| 5006 | 100 |

FIG. 6

Profile base created during generation

| Range | probability | Score |
|---|---|---|
| 1-3 | 0.35 | 1.0 |
| 10 | 0.001 | 0.001 |
| 1000-1001 | 0.01 | 0.01 |
| 5000-5001 | 0.3 | 1.0 |
| 5005-5006 | 0.3 | 1.0 |

FIG. 7

Profile Base: according to figure 10

| Value | Score | Reason |
|-------|-------|--------|
| 1 | 1.0 | Part of the high range 1-3 |
| 5010 | 0.86 | Based on distance of 4 from high range 5005-5006 |
| 4867 | 0.6 | Based on distance of 134 from high range 5001-5002 |
| 1002 | 0.009 | Based on distance of 1 from low range 1000-1001 with probability 0.01 |
| 5 | 0.9 | Based on distance of 2 from high range 1-3, which is higher than the score we would have received if using distance to the low range 10-10 |
| 10 | 0.8 | Based on distance of 7 from high range 1-3, which is higher than the score we would have received if using the fact 10 is part of range 10-10 |

FIG. 15

Profile Base for Range Test: 5-7, i.e. allowed parameter value length varies between 5 and 7 characters.

Profile Base for character Groups test: lowercase letters and digits, i.e. only lowercase letters and digits are allowed in value of a parameter

| Value | Range Test | Char. Test | Total Score | comments |
|---|---|---|---|---|
| abc12 | 1.0 | 1.0 | 1.0 | Length is ok; char groups are ok. |
| abcde123 | 0.9 | 1.0 | 0.95 | Length is very close; char groups are ok |
| ABCDE | 1.0 | 0.9 | 0.95 | Length is ok; char groups are close. |
| %%%%% | 0.01 | 1.0 | 0.49 | '%' is very "far" from the allowed char groups. length is ok |
| abcd12@@@@ | 0.55 | 0.8 | 0.67 | '@' is "pretty far" from the allowed char groups. length is "pretty close" to allowed |

FIG. 16

| Mode | Learning | Validating | Description |
|---|---|---|---|
| Automatic | On | On | Default to all applications. Continuous Learning is performed. Validation is performed on all objects with learned profile. System detects application changes. |
| Unprotected | Off | Off | No learning or validation is performed. System doesn't detect changes |
| Learning | On | Off | Continuous Learning is performed, but generated profile is not validated (no events are triggered). System doesn't detect application changes. |
| Locked | Off | On | No Continuous Learning only validation is performed. Profile is locked and will not be changed. Events on Invalid URLs and parameters are triggered (new ones will not be learned). System detects application changes. |

FIG. 17

| HTTP Constraints - DYNEC:8083 | | ☒ |
|---|---|---|

HTTP Constraints:

| Constraint | Value | Protected |
|---|---|---|
| Set for All Constraints | | ☐ |
| Ignore URL fragments | No | ☑ |
| Maximum chunks in request content | 20 | ☑ |
| Supported file extensions | asmx, asp, aspx, bmp, cfm, cg... | ☐ |
| No file extensions allowed | No | ☐ |

HTTP Constraints that are modified by the Adaption process:

| Constraint | Value | User Defined | Protected |
|---|---|---|---|
| Set for All Constraints | | | ☐ |
| Maximum URL Length (before query) | 31 | | ☑ |
| Maximum length of query | 0 | | ☑ |
| Maximum number of Parameters | 0 | | ☑ |
| Maximum length of Parameter | 2 | | ☑ |
| Maximum number of Headers | 22 | | ☑ |
| Maximum length of Header | 37 | | ☑ |

| Set to Default | OK | Cancel | Apply | Help |
|---|---|---|---|---|

FIG. 19

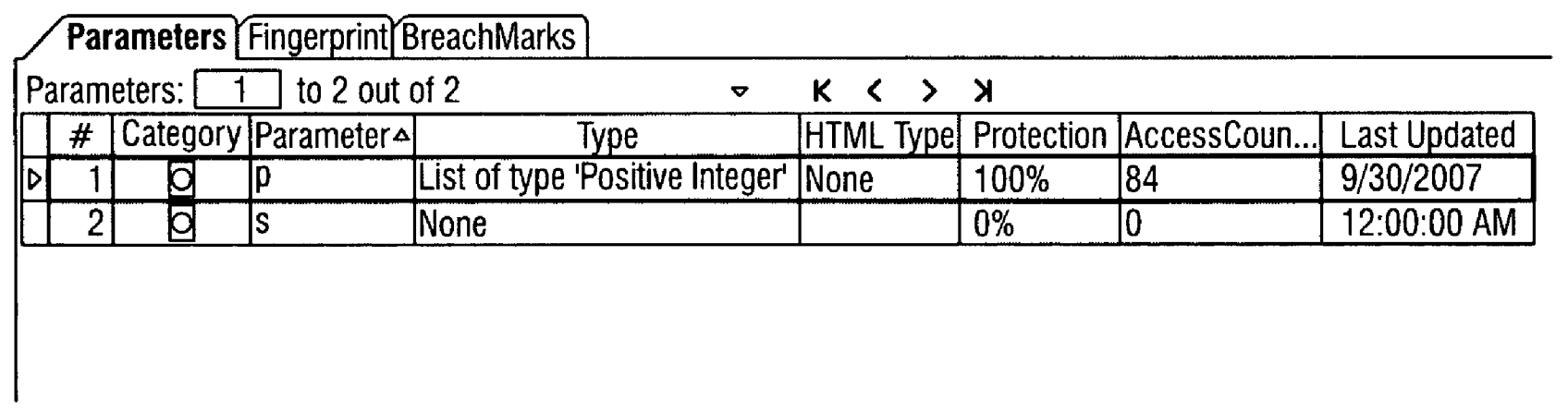

| Parameters | Fingerprint | BreachMarks | | | | | |
|---|---|---|---|---|---|---|---|
| Parameters: 1 to 2 out of 2 ▷ ⋉ < > ⋊ | | | | | | | |
| # | Category | Parameter △ | Type | HTML Type | Protection | AccessCoun... | Last Updated |
| △ 1 | ◉ | p | List of type 'Positive Integer' | None | 100% | 84 | 9/30/2007 |
| 2 | ◉ | s | None | | 0% | 0 | 12:00:00 AM |

FIG. 21

| Parameter Settings | ☒ |
|---|---|
| ⊟ General | |
| Parameter Name | p |
| URL | |
| Protection | 100% |
| Last Updated | 9/30/2007 |
| ⊟ Location | |
| Query | ☑ |
| Content | ☐ |
| Multipart Form Data | ☐ |
| ⊟ Appearances | |
| Multiple Appearances | ☐ |
| ⊟ Content | |
| Type of Constant | None |
| Password | ☐ |
| Type | List of Positive Integer |
| Length of Values | 1 |
| Character groups | Numeric |
| Values | 1 |
| Accept zero value (0) | ☐ |

[ OK ]  [ Cancel ]  [ Apply ]  [ Help ]

FIG. 22

Fingerprint Settings

| ⊟ General | |
|---|---|
| URL | / |
| Protection | 0% |
| Last Updated | 9/30/2007 |
| ⊟ Attributes | |
| Page Type | Dynamic |
| Content Type | Not Applicable |
| Content Size(KB) | |
| Titles | Not Applicable |
| ⊟ HTML Tags | |
| Number of Images | Not Applicable |
| Number of Links | Not Applicable |
| Number of Forms | Not Applicable |

[ OK ]   [ Cancel ]   [ Apply ]   [ Help ]

FIG. 24

| Parameters | Fingerprint | BreachMarks | | | | |
|---|---|---|---|---|---|---|
| ⚐ Attribute is still being learned | | | | | | |
| | Type | Name | Format | Appearance | Protection | Last Updated |
| | 🔔 | Credit Card Number | String | Not Applicable | 0% | Never |
| | 🔔 | Social Security Number | String | Not Applicable | 0% | Never |
| | 🔔 | California ID Number | String | Not Applicable | 0% | Never |

FIG. 25

A. - if attribute is applicable
N.A - if attribute is not applicable
P - if Validation passed
F - if Validation failed A. - if attribute is applicable
N.A - if attribute is not applicable
P - if Validation passed
F - if Validation failed

METHOD AND APPARATUS FOR DETECTION OF INFORMATION TRANSMISSION ABNORMALITIES

RELATED APPLICATIONS

This application claims the benefit of U.S. Provisional Patent Application Ser. No. 60/988,212, filed Nov. 15, 2007, entitled "A METHOD AND APPARATUS FOR DETECTION OF INFORMATION TRANSMISSION ABNORMALITIES," which is hereby incorporated by reference in its entirety.

TECHNICAL FIELD

At least one embodiment of this invention pertains to the security of computer networks, and more particularly, to the security of network applications.

BACKGROUND

Recent, well publicized, security breaches have highlighted the need for improved security techniques to protect consumer privacy and secure digital assets. Examples of organizational victims of cybercrime include well known companies that typically have traditional Web security in place, yet cyber criminals have still been able to obtain personal data from financial, healthcare, retail, and academic Web sites. Organizations that have publicly confirmed exposure of client or customer information put the figure at over 500,000 people who were victims of cybercrime in 2005, and those are the organizations that have publicly confirmed a security breach. It is highly likely that more organizations were also impacted, but did not reported it, and more troubling yet, other organizations may have had information leakage but are completely unaware of the situation.

Organizations can not afford negative brand image, credibility damage, legal consequences, or customers losses. In one example, in June 2005 MasterCard and Visa reported that a third party processor, CardSystems, had exposed credit card transaction records of approximately 40 million people that included names, card numbers and security codes. The CardSystems situation is an unfortunate example of how a single security breach can materially impact a business, yet it is also a wake up call for anyone doing business online.

The disclosure of some of these Web security breaches has led law enforcement to determine, after careful investigation, that cybercrime is being driven by organized crime. This is very different than the bright kid-next-door trying to break into a system to prove bragging rights. Targeted rings of well educated and sophisticated hackers have been uncovered, often in countries where prosecuting them is a challenge. Contributing to the increase in cybercrime is the ease with which these organized cyber criminals can target, and hack, a Web application from anywhere in the world with simple Internet access.

Properly securing Web applications and the data behind them is a critical component to doing business on the Web. Often, some of the most valuable organizational data is served through a Web browser making it more important than ever to safeguard this information from cybercriminals.

Need for Increased Security

In response to increased cybercriminal activity, government regulations for privacy and accountability mandate a standard of security, and customer notification if personal data is lost or stolen. In the U.S., many states have enacted a form of the Information Security Breach Act and other states have similar pending privacy legislation. As new disclosure standards emerge, consumers expect to be notified in the event of a security breach. Organizations are motivated by government regulations or consumer expectations to incorporate the necessary security measures to safeguard data. Organizations also desire to demonstrate, through security audits, that reasonable due care is taken to protect customer and financial information and that customers are notified in the event of a data theft or loss.

Some industries, such as the credit card industry, have created their own security standards to proactively address the need for managing customer data more securely and consistently. The Payment Card Industry (PCI) Data Security Standard requires Master-Card merchants to protect cardholder data, encrypt transmissions and stored data, and develop and maintain secure systems and applications. (See "Payment Card Industry Data Security Standard" at URL https://sdp.mastercardintl.com/pdf/pcd_manual.pdf (January 2005).

Similarly, the VISA Cardholder Information Security Program (CISP) requires compliance to its standards for all entities storing, processing, or transmitting cardholder data. For example, VISA merchants must prove CISP compliance, follow outlined disclosure policies in the event of data theft or loss, and are subject to hefty financial penalties (up to $500,000 per incident) for non-compliance. (See "VISA Cardholder Information Security Program" at URL http://usa.visa.com/business/accepting_is a/ops_risk_management/cisp_merchants.html.)

Because the number of notification laws to be enacted is likely to increase, organizations are motivated to improve and validate existing security measures that protect the organization from Web threats and to demonstrate to regulators and stakeholders that security is interwoven into the business operations.

Shortcomings in Existing Security Measures

The growth in popularity and general acceptance of the Web as a network for commerce and communications has been unprecedented. However, security was not part of the original design of the Web so it is susceptible to security breaches. Further exacerbating the lack of security measures in the original design of the Web, many organizations are aggressively moving applications to the Web that were originally created for an internal network environment. The push to make applications available sometimes outweighs thorough security testing of the applications, and potentially opens the door to unanticipated vulnerabilities being uncovered once the application is available on the Internet.

Before Web applications became so popular sensitive information was typically stored in databases and applications on internal networks. Cybercriminals, such as hackers, wanting to obtain this information would have to gain access to the data by breaking into servers deeper and deeper within an organization's network until they found something useful. Network security solutions, such as firewalls and intrusion detection systems, were designed to meet this threat.

As applications have moved to the Web, hackers have shifted their strategy from attacking organizations by searching for vulnerable servers that can be compromised, to targeted attacks against Web applications. The use of Web applications provides a front-end to an organization's mission-critical data. Hackers no longer need to search through a network to find the data they are looking for, they can now simply browse an organization's Web site. In addition, each of the applications is different and thus, cannot typically be protected by generic measures as was possible for traditional network security solutions. Generally, each Web application requires protective measures tailored to its specific needs.

A common misconception in Web security is that using Secure Sockets Layer (SSL) will protect a Web application from attacks. While SSL supports secure transmission of sensitive information, it does not protect a Web application from attack. Attacks can be sent using SSL and the SSL transmission goes through firewalls because the firewall will usually have a port, typically port 443, open to permit SSL traffic. Using SSL provides protection for data during transmission, but it does not afford protection from attacks against the Web application, such as SQL Injection discussed further below. Many hackers have discovered that by sending attacks through SSL, they can circumvent network security because these network devices are unable to view this encrypted data.

Prior, or first-generation, application protection solutions or application firewalls followed the same paradigm as network firewalls. In these types of solutions, a negative, or list-based, model of application level threats is used to screen for potential application-level attacks. However, because each application is unique, a list-based or negative security model is generally not effective at securing the Web application from attacks.

Thus, there is a need for improved systems and techniques to protect Web applications from security breaches.

SUMMARY

The present invention includes methods, apparatuses, and systems as described in the written description and claims. In one embodiment, a method of adapting to changed conditions and analyzing network communication with respect to a profile of acceptable behavior is described. The profile of acceptable behavior including probability values of network communication parameters developed from a collection of historical network communication. The method includes receiving a current network communication where the current network communication includes a first network communication parameter and a second network communication parameter. The first network communication parameter is independent and/or mutually exclusive from the second network communication parameter. In addition, the method includes assigning a first probability value indicative of the first network communication parameter where the first probability value is based on a comparison of the first network communication parameter against the profile of acceptable behavior. Further, the method includes assigning a second probability value indicative of the second network communication parameter. The second probability value is also based on a comparison of the second network communication parameter against the profile of acceptable behavior. The second probability value is statistically independent of the first probability value. The probability value of the current network communication is determined by aggregating the first and second probability values of the first and second network communication parameters. The current network communication is then validated against the profile of acceptable behavior based upon whether or not the probability value of the current network communication meets a threshold criteria. In one embodiment, a responsive action is triggered based on the result of the validation.

The method also includes storing the current network communication in a buffer until enough data has been accumulated for the current network communication to be statistically valid. The storing of the network information in a buffer can include storing the first and/or second network communication parameter in a buffer until enough data has been accumulated for the first and/or second network communication parameter to be statistically valid. The current network communication is determined to be statistically valid based on one of time since the collection of the current network communication started, the number of a current inbound communication and current outbound communication of the current network information and diversity of the current network information. In addition, the method includes merging the current network communication to the profile of acceptable behavior when the current network communication meets the threshold criteria. An alert is triggered when the current network communication fails to meet the threshold criteria. In other embodiments, the method includes forwarding the current network communication to an administrator for further analysis when the current network communication fails to meet the threshold criteria. The threshold criteria can be based on a threshold probability value where network communication is rejected when the current network communication is below the threshold probability value. Also, the probability value of the current network communication is 1 if it meets the threshold criteria and the probability value is unchanged if it fails to meet the threshold criteria. In some embodiments the threshold probability value includes a range of probability values. In other embodiments the probability value of the current network information is a multiplication of the probability values of the first and second network communication parameters.

In another embodiment, a method for adapting to changed conditions and analyzing network traffic in a network application system is described. The method includes developing a profile of acceptable behavior for network information for transmission over a network. The profile of acceptable behavior including probability values of network communication parameters developed from a collection of historical network communication. The method further includes receiving a current network communication where the current network communication includes multiple current network communication parameters. Each of the current network communication parameters is independent of each other. Assigning a probability value indicative of each of the current network communication parameter where the probability value is based on a comparison of each of the current network communication parameter against the profile of acceptable behavior. The method also includes determining the probability value of the current network communication by aggregating the probability value of each of the current network communication parameter. The current network communication is then validated against the profile of acceptable behavior based upon whether or not the probability value of the current network communication meets a threshold criteria. A responsive action may be triggered based on the result of the validation. In some embodiments, the method includes storing the multiple current network communication parameters of the current network communication in a buffer until enough information has been accumulated for each of the network communication parameters to be statistically valid. The current network communication parameter is determined to be statistically valid based on one of time since the collection of the current network communication parameter started, number of network communication including current network communication parameter and the diversity of the current network communication.

In yet another embodiment, a system for adapting to changed conditions and analyzing network traffic in a network application system is described. The system includes a dynamic profiling module, a control module, a buffer, an adaptation module and a correlation and analysis module.

The dynamic profiling module develops a profile of acceptable behavior for network information for transmission over a network. The control module receives a current network communication where the current network communication includes multiple current network communication parameters and each of the current network communication parameters independent of each other. The control module also assigns a probability value indicative of each of the current network communication parameter. The probability value is based on a comparison of each of the current network communication parameter against the profile of acceptable behavior. In one embodiment, the control module determines the probability value of the current network communication by aggregating the probability value of each of the current network communication parameter. The control module also validates the current network communication against the profile of acceptable behavior based upon whether or not the probability value of the current network communication meets a threshold criteria and triggers a responsive action based on the result of the validation.

The buffer stores the multiple current network communication parameters of the current network communication in a buffer until enough information has been accumulated for each of the network communication parameters to be statistically valid. The current network communication parameter is determined to be statistically valid based on one of time since the collection of the current network communication parameter started, number of network communication including current network communication parameter and the diversity of the current network communication. In some embodiments, an adaptation module merges the current network communication to the profile of acceptable behavior when the current network communication meets the threshold criteria. In other embodiments, correlation and analysis module configured to analyze the current network communication to determine the security risk of the current network communication when the current network communication fails to meet the threshold criteria.

Other features and advantages of the present invention will become more readily apparent to those of ordinary skill in the art after reviewing the following detailed description and accompanying drawings.

BRIEF DESCRIPTION OF THE DRAWINGS

FIG. 6 is an example of a profile base of "parameter value length" test according to an embodiment.

FIG. 7 is a table illustrating a probability function based on a profile base of "parameter value length" test according to an embodiment.

FIG. 15 is a table illustrating an example of score calculation for single test ("parameter value length" test) according to an embodiment.

FIG. 16 is table illustrating an example of score calculation for multiple tests ("parameter value length" test and "parameter value characters" test) according to an embodiment.

FIG. 17 illustrates an example of the protection settings of an application according to an embodiment.

FIG. 19 is a display of an exemplary http constraints display according to an embodiment.

FIG. 21 is a display of an exemplary url entry control according to an embodiment.

FIG. 22 is a display of an exemplary url entry control of parameter tests according to an embodiment.

FIG. 24 is a display of an exemplary url exit control of URL fingerprint according to an embodiment.

FIG. 25 is a display of an exemplary url exit control of URL BreachMarks according to an embodiment.

DETAILED DESCRIPTION

A method and apparatus for detection of information transmission abnormalities is described below. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Figure 1:
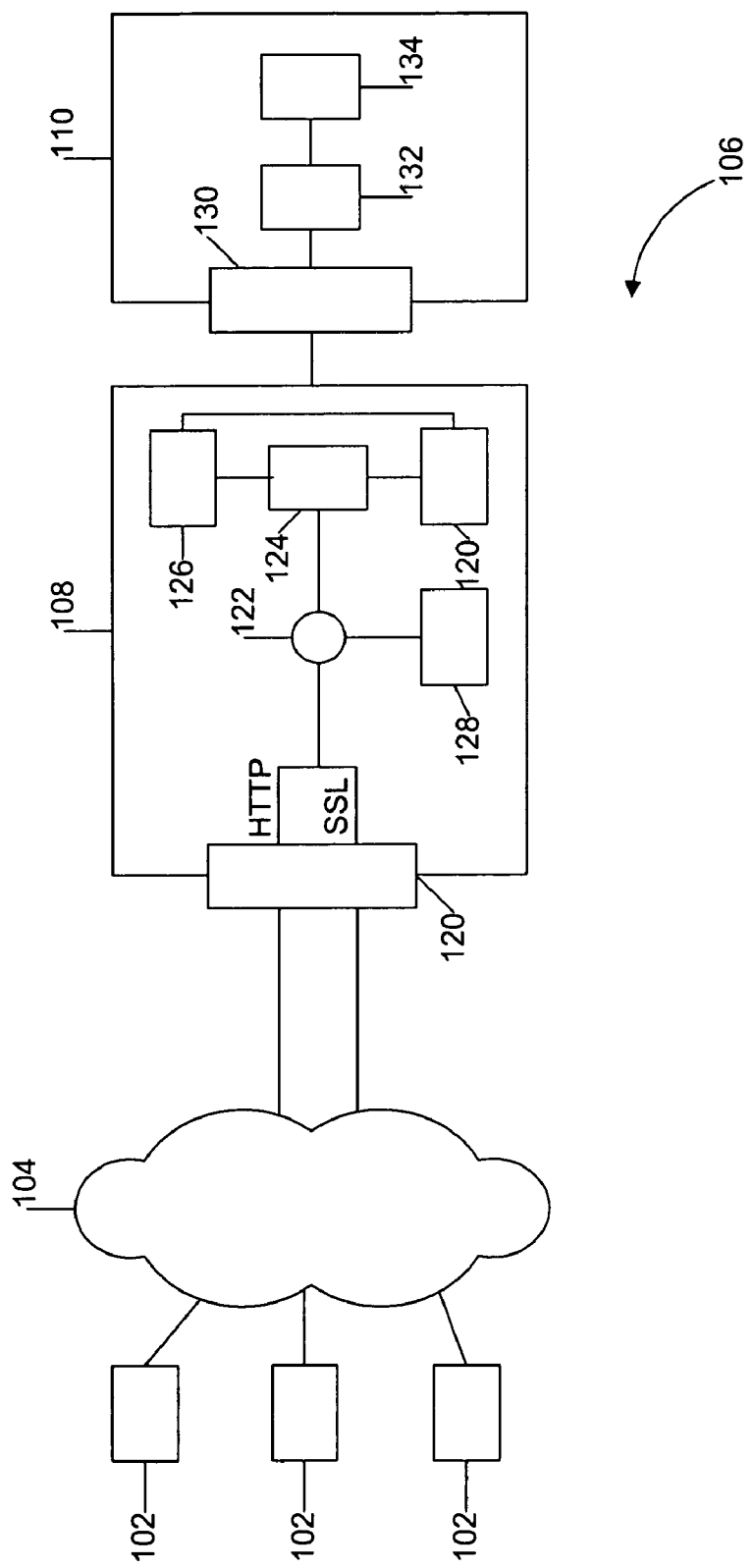
FIG. 1 is a block diagram of an exemplary system configured in accordance with aspects of the invention.

FIG. 1 is a block diagram of an exemplary system configured in accordance with aspects of the invention. Various embodiments of the present disclosure can be implemented in the system. As shown in FIG. 1 users 102 are in communication with a wide area network 104. The wide area network 104 may be a private network, a public network, a wired network, a wireless network, or any combination of the above, including the Internet. Also in communication is a computer network 106. A typical computer network 106 may include two network portions, a so called demilitarized zone (DMZ) 108, and a second infrastructure network 110. The DMZ 108 is usually located between the wide area network 104 and the infrastructure network 110 to provide additional protection to information and data contained in the infrastructure network 110.

For example, the infrastructure network 110 may include confidential and private information about a corporation, and the corporation wants to ensure that the security and integrity of this information is maintained. However, the corporation may host a web site and may also desire to interface with users 102 of the wide area network 104. Thus a user 102 can communicate with the infrastructure network 110 via the DMZ 108 by sending a user request and receiving a response from the infrastructure network 110. The user communication and any communication from the infrastructure network 110 can be referred to as network communication, network traffic, network information or message. The network communication includes inbound communication to the web/network application or outbound communication from the web application. Also the network communication can be a data stream, voice, data, video or the like that represents requests to, or reply from network/web applications hosted on the infrastructure network 110. For example, the corporation may be engaged in e-commerce and wants to use the wide area network 104 to distribute information about products that are available to customers, and receive orders from customers. The interface to the wide area network 104, which is generally more susceptible to attacks from cybercriminals is through the DMZ 108, while sensitive data, such as customer credit card information and the like, are maintained in the infrastructure network 110 which is buffered from the wide area network 104 by the DMZ 108.

Examples of components in a DMZ 108 include a firewall 120 that interfaces the DMZ 108 to the wide area network 104. Data transmitted and received from the wide area network 104 pass through the firewall 120, through a mirror port 122 to a load balancer 124 that controls the flow of traffic to Web servers 126. The network 104 can be for example a wide area network such as the web, a private network, public network, a wired network, a wireless network, or a combination of the above including the internet etc. Also connected to the mirror port 122 is a Web application protection module 128. As described further below, the Web application protection module 128 monitors traffic entering and leaving the DMZ to detect if the Web site is being attacked. Traffic flows between the DMZ 108 and the infrastructure network 110 through a second firewall 130 that provides additional security to the infrastructure network 110. Components in the infrastructure network 110 can include an application server 132 and a database server 134. Data and information on the application server 132 and database server 134 are provided additional protection from attacks because of the operation of the DMZ.

The application server 132 receives the network communication or generates network communication. In one embodiment, the application server can be configured to assign a probability value to the network communication. The probability value is representative or indicative of whether the communication is acceptable. An algorithm can be implemented in the application server 132 for assigning the probability values to the network communication. In other embodiments the algorithm can be independent of the application server 132. The algorithm can be software running on the application server 132. The algorithm implemented in the application server 132 can also be configured to partition the network communication into network communication parameters or attributes and assign probability values to the occurrences of values or data in the network communication parameters. The network communication parameters can be statistically independent of each other and can be referred to as independent aspects of a network communication. Examples of network communication parameters of a network communication include characters, numbers, strings, integers, length of data, character groups, cookies, headers and the like. The network communication parameters can also be customized for particular user protocols or application defined parameters (e.g., fields) having expected data types such as nine digit numbers such as social security numbers, customer numbers, data that matches a pattern for credit card numbers, drivers license numbers, birth dates, password, predefined list of regular expressions, session identifications, indexes of an expression etc. The assigned probability values are based on a verification of the independent parameters or aspects of the network communication against a profile of acceptable or legitimate behavior for a user of a network application hosted by the application server 132. The algorithm further determines and aggregates the probability values of the independent parameters or aspects of the network information to determine the probability of the network information. A determination is made as to whether the probability of the network information is above or below a threshold probability value according to the algorithm. A responsive action can be generated, triggered or initiated by the algorithm in response to the determination that the probability of the network information is above or below the threshold probability value. In other embodiments, the algorithm can be implemented in the DMZ 108. The technique introduced here enables better collection of historical data used to build a profile of acceptable or legitimate behavior of a user 102 and better detection of a change in the input and output pattern of a user 102 that is based on a change in the network application or a change in the application data.

Figure 2:
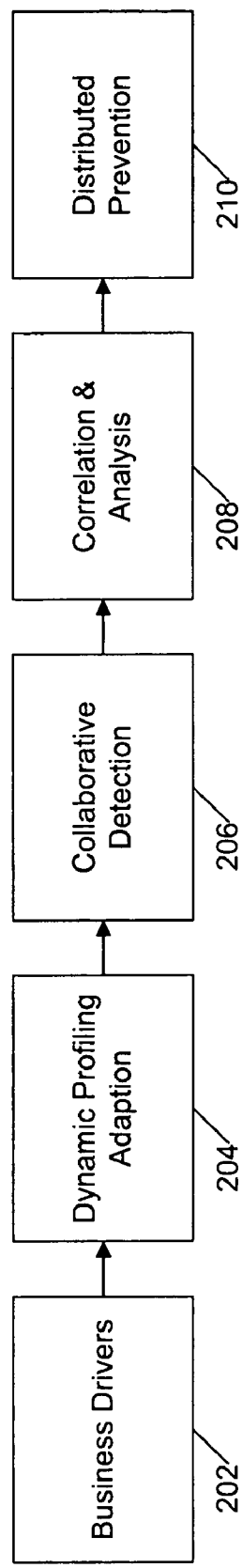
FIG. 2 is a block diagram illustrating aspects of an exemplary embodiment of a Web application protection system which can be carried out by the Web application protection module of FIG. 1.

FIG. 2 is a block diagram illustrating aspects of an exemplary embodiment of a Web application protection system which can be carried out by the Web application protection module 128 in FIG. 1. As shown in FIG. 2, a business driver module 202, provides input about the types of threats that are anticipated, and that protection against is sought, or the types of audits or regulations that an entity wants to comply with. Examples of threats include identity theft, information leakage, corporate embarrassment, and others. Regulatory compliance can include SOX, HIPAA, Basel LL, GLBA, and industry standards can include PCI/CISP, OWASP, and others. The business driver module 202 provides input to a dynamic profiling module 204.

The dynamic profiling module 204 develops profiles of Web applications. The profiles can take into account the business drivers. The profiles can also be adapted as Web applications are used and user's behavior is monitored so that abnormal behavior may be identified. The profiles can also be adapted to identify what types of user input or network communication is considered appropriate, or acceptable. In one embodiment, the dynamic profiling module provides input to a collaborative detection module 206.

The collaborative detection module 206 uses the input from the dynamic profiling module 204 to detect attacks against a Web application. The collaborative detection module can monitor, and model, a user's behavior to identify abnormal behavior of a user accessing a Web application. The collaborative detection module 206 can also monitor user activity to identify signatures of attack patterns for known vulnerabilities in a Web application. Other aspects include protection against protocol violations, session manipulation, usage analysis to determine if a site is being examined by a potential attacker, monitoring out bound traffic, or exit control, as well as other types of attack such as XML virus, parameter tampering, data theft, and denial of services attacks. The collaborative detection module 206 provides the results of its detection to a correlation and analysis module 208.

The correlation and analysis module 208 receives the detection results from the collaborative detection module 206 and performs event analysis. The correlation and analysis module 208 analyses events reported by the collaborative detection module 206 to determine if an attack is taking place. The correlation and analysis module 208 can also correlate incoming requests from users with outgoing response to detect if there is application defacement or malicious content modification being performed. The correlation and analysis module may establish a severity level of an attack based upon a combined severity of individual detections. For example, if there is some abnormal behavior and some protocol violations, each of which by itself may set a low severity level, the combination may raise the severity level indicating that there is an increased possibility of an attack. The output of the correlation and analysis module 208 is provided to a distributed prevention module 210.

The distributed prevention module 210 provides a sliding scale of responsive actions depending on the type and severity of attack. Examples of responses by the distribution prevention module 210 include monitor only, TCP-resets, load-balancer, session-blocking, firewall IP blocking, logging users out, and full blocking with a web server agent. The distribution prevention module 210 can also include alert mechanisms that provide event information to network and security management systems trough SNMP and syslog, as well an email and console alerts.

Using the dynamic profiling module 204, collaborative detection module 206, correlation and analysis module 208, and distributed prevention module 210 provide security for a Web application. Improved Web application security provides protection of privileged information, increased customer trust and confidence, audit compliance, increased business integrity, and brand production.

Figure 3:
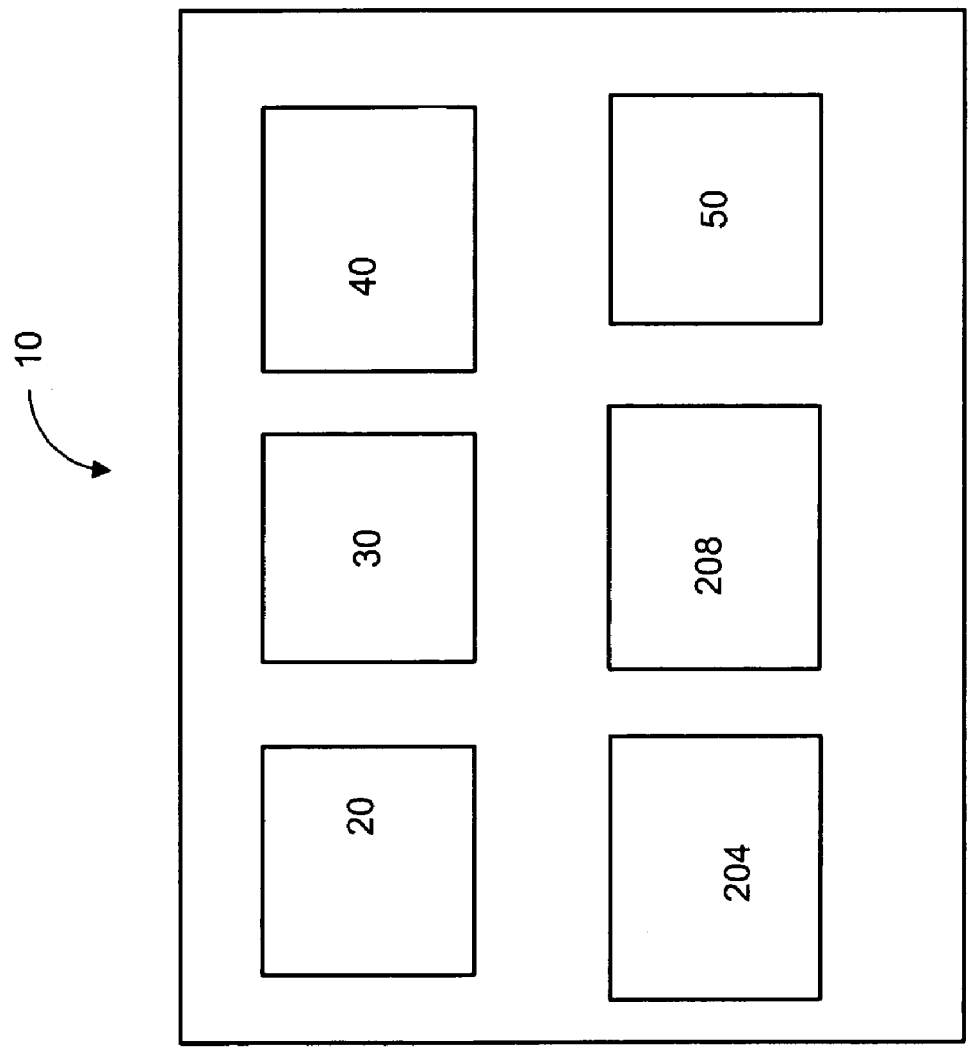
FIG. 3 illustrates one example of a threat detection module according to an embodiment.

FIG. 3 illustrates one example of a threat detection module according to an embodiment. For explanatory purposes, FIG. 3 will be discussed with reference to FIG. 1 and FIG. 2. The threat detection module 10 can be implemented in the DMZ 108 of FIG. 1. Specifically, the threat detection module 10 can be implemented in the web application protection module 128 of FIG. 1. In some embodiments, the threat detection module 10 is independent of the DMZ 108. The threat detection module 10 includes a buffer 20, a control module 30, a dynamic profiling module 204, a storage device 40, an adaptation module 50 and a correlation and analysis module 208.

As previously described, the dynamic profiling module 204 develops a profile of acceptable behavior for a network/web application on the infrastructure network 110, for example. The profile of acceptable behavior is developed for transmission of network communication to and from, for example, a web application over the network 104. The profile of acceptable behavior includes probability values of network communication parameters developed from a collection of historical network communication. The control module 30 receives a current network communication from a user device 102 and/or from the infrastructure network 110 of FIG. 1. The current network communication can include multiple current network communication parameters and the current network communication parameters can be independent of each other. The control module 30 also assigns a probability value indicative of each of the current network communication parameter. The probability value is based on a comparison of each of the current network communication parameter against the profile of acceptable behavior. An algorithm can be implemented in the control module 30 for assigning the probability values to the current network communication parameters of the network communication. The algorithm can be software running on the control module 30 and stored in a storage device 40 from where it is retrieved for execution. In some embodiments, the algorithm implemented in the control module 30 can be configured to partition the network communication into the multiple network communication parameters and assign probability values to the multiple network communication parameters. The assigned probability values are based on a verification of the network communication parameters against a profile of acceptable or legitimate behavior for a user 102 of a network application hosted by the application server 132. The control module 30 determines the probability value of the current network communication by aggregating the probability value of each of the current network communication parameters. In one embodiment, the probability value of the network communication is the weighted average of probability values of each network communication parameters. The probability value of the network communication can also be a multiplication of the probability value of the of each network communication parameters. In some embodiments, each network communication parameter is mutually exclusive from the other. The probability values assigned to the network communication parameter are obtained by comparing similar network communication parameter that have been assigned probability values based on their frequency of occurrence over time. The control module 30 also validates the current network communication against the profile of acceptable behavior based upon whether or not the probability value of the current network communication meets a threshold criteria. The threshold criteria can be based on a threshold probability value. In one embodiment, the probability value of the network communication is 1 if it is above the threshold probability value and the probability value is unchanged if it is below the threshold probability value. Different threshold probability values may be assigned depending on the severity of the variation from the learned profile of acceptable behavior. In other embodiments, the threshold probability value can include a range of probability values. A determination is made automatically or by the user based on whether or not the probability value of the network communication is in the range of the threshold probability values. A responsive action can be generated by the control module 30 in response to the determination that the probability of the network communication meets the threshold criteria. In one embodiment, the responsive action includes merging the current network communication to the profile of acceptable behavior when the current network communication meets the threshold criteria. The responsive action can include accepting the network communication if the probability value of the network information meets the threshold criteria or rejecting the network communication if the probability value fails to meet the threshold criteria. The responsive action also includes forwarding the current network communication to an administrator for further analysis when the current network communication fails to meet the threshold criteria.

As previously described, the correlation and analysis module 208 analyzes network communication to determine if an attack or other adverse activity is taking place. In one embodiment, the network communication is forwarded to the correlation and analysis module 208 when the probability value of the network information fails to meet the threshold criteria. The technique introduced here enables better collection of historical data used to build a profile of acceptable or legitimate behavior of a user 102 and better detection of a change in the input and output pattern of a user 102 that is based on a change in the network application or a change in the application data.

In one embodiment, the control module 30 includes a statistical model configured to assign probability values to independent aspects of the network information/communication. The statistical model may learn or be improved only from communications that have been analyzed and proved acceptable by at least one threat-detection engine. The network communication is proven to be acceptable if it passes a test of at least one threat-detection engine. The network communication rejected by the at least one threat-detection engine is screened and/or rejected from the statistical model. In other embodiments, the statistical model learns requests that were rejected by the statistical model allowing the statistical model to adapt itself to changes in a network application. Thus, a change in the network application that meets the threshold criteria is automatically adapted by the statistical model. A change in the network application that fails to meet the threshold criteria is adapted by the statistical model depending on threshold of other tests or user input such as a signature validation test or a user defined constraint.

Another embodiment addresses the issue of adapting to changed conditions without loosing the ability to detect malicious attacks. In this embodiment, network communication is received at the buffer 20 and the network communication is stored in the buffer until enough communication has been accumulated to be statistically valid. In one embodiment the network communication is parsed into network communication parameters where the network communication parameters are independent of each other. The communication is considered enough or otherwise statistically valid against the number of possible options spanned by the independent network communication parameters of the network communication or data set. The network communication parameter is stored at the buffer 20 until enough information has been accumulated for the network communication parameter to be statistically valid. The process of accumulating network communication parameters at the buffer may be conducted individually for each parameter or contemporaneously. The buffer 20 may also include multiple buffers for storing multiple network communication parameters. In some embodiments, when enough data for a network communication parameter has been accumulated in the buffer 20 the network communication parameter is validated against a profile of acceptable behavior and the control module 30 generates a probability value for the network communication parameter. The process continues until the network communication is validated. Whether the network communication parameter accumulated is sufficient can depend on the following factors: time since collection has begun, the number of requests and the diversity of the network information.

When the network communication fails to meet the threshold criteria the network communication is sometimes referred to as an anomaly or an attack. Note that an anomaly or attack event is not triggered for every violation of the profile of acceptable behavior, instead several validation tests are performed on the request and the combination of their results (e.g. weighted average) will decide if an event should be triggered or not. Generally the profile of acceptable behavior shown in a Graphic User Interface (GUI) differs from the profile that triggers events. The profile in the GUI can represent the "trusted profile" i.e. values with a high probability score, for example, probability values that exceed the threshold criteria. Likewise a deviation from the profile of acceptable behavior may not automatically trigger an event, such as rejecting the network communication. Instead a measure of the severity of the deviation followed by a determination to trigger an event if the deviation is severe. The network communication may be rejected if it is determined that the network communication is so different than the profile of acceptable or legitimate behavior to warrant a rejection, or otherwise the network communication is merged with the profile of acceptable or legitimate behavior if the network communication meets the threshold criteria.

Several tests are run on each request or response (inbound or outbound communication of the network communication) and each test will have a score between of 0 and 1, where the higher the score the better the chances that the information is legitimate or meets the threshold criteria. A "request score" function in the control module 30, for example, combines all the scores (or probability values) of all the network communication parameters of the requests or response (weighted average). In general the weight given to each of the tests is not configurable by the user. However, configuration may be possible using a database via a maintenance tool. The request score is compared to a threshold probability value. The threshold criteria can include a range of probability values including, for example, an attack threshold probability value and an anomaly threshold probability value. A score or probability value lower than the attack threshold probability value triggers an attack event while a score or probability value lower than the anomaly threshold probability value triggers an anomaly event. Probability threshold values Thresholds & weights can be tuned during implementation of a pilot framework and will not need to be adjusted for each new client.

Figure 4:
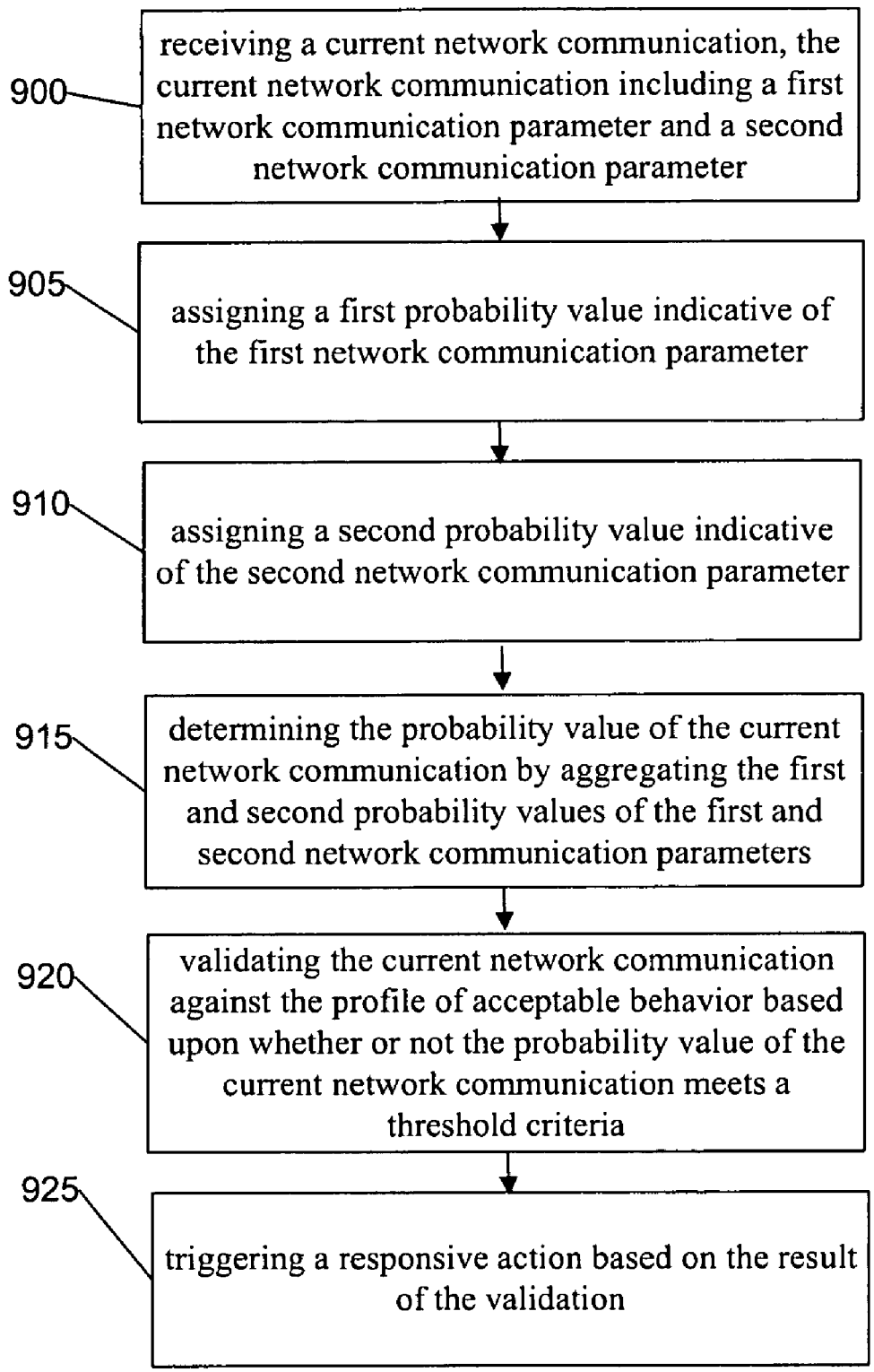
FIG. 4 is a flow chart illustrating one embodiment of a method for detecting information transmission abnormalities according to an embodiment.

FIG. 4 is a flow chart illustrating one embodiment of a method for detecting information transmission abnormalities according to an embodiment. The method also analyzes network communication with respect to a profile of acceptable behavior including probability values of network communication parameters developed from a collection of historical network communication. The method can be implemented in the control module 30 of FIG. 3.

At block 900 the process starts with receiving a current network communication where the current network communication includes a first network communication parameter (the specific value or content of that parameter in the current communication) and a second network communication parameter (again, meaning the value). In one embodiment, the first network communication parameter is statistically independent of the second network communication parameter. At block 905 a first probability value that is indicative of the first network communication parameter is assigned to the first network communication parameter. The probability value is based on a comparison of the first network communication parameter against the profile of acceptable behavior. At block 910 a second probability value that is indicative of the second network communication parameter is assigned to the second network communication parameter. The probability value is based on a comparison of the second network communication parameter against the profile of acceptable behavior. The process then continues to block 915 where the probability value of the current network communication is determined by aggregating the first and second probability values of the first and second network communication parameters. At block 920 the current network communication is validated against the profile of acceptable behavior based upon whether or not the probability value of the current network communication meets a threshold criteria. Finally, at block 925 a responsive action is triggered based on the result of the validation. In one embodiment, the method further comprises storing the current network communication in a buffer until enough data has been accumulated for the current network communication to be statistically valid. In other embodiments, the method further comprises merging the current network communication to the profile of acceptable behavior when the current network communication meets the threshold criteria.

Figure 5:
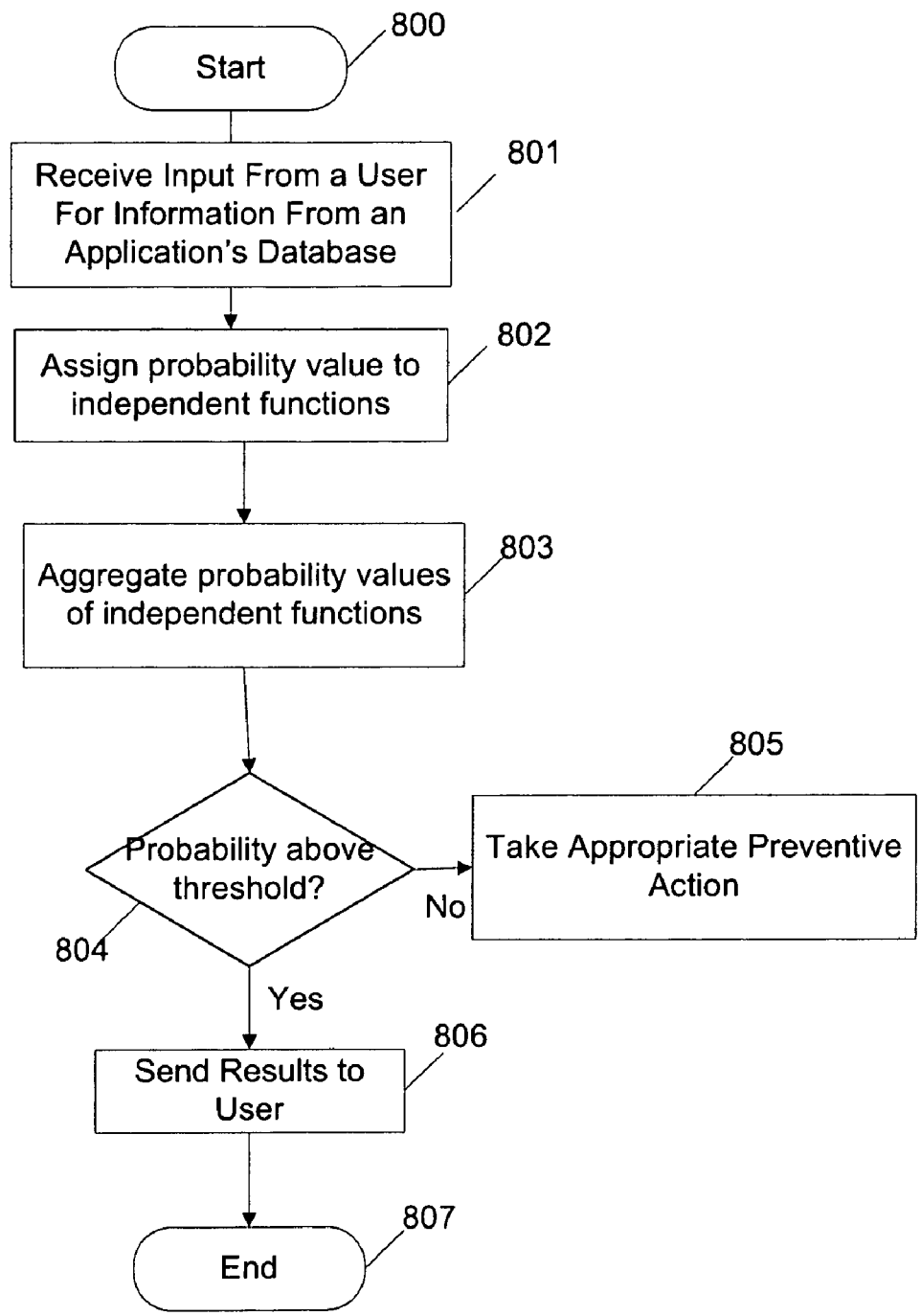
FIG. 5 is a flow chart illustrating another embodiment of a method for detecting information transmission abnormalities according to an embodiment.

FIG. 5 is a flow chart illustrating one embodiment of a method for detecting information transmission abnormalities. FIG. 5 is a specific example of the process of FIG. 4. The flow begins in block 800. In step 1 at block 801 a current network communication such as an input is received from user requesting network communication or information from an application's data base. An example of a user requesting information from a database includes a shopper requesting the price or availability of an item at a shopping website. In step 2 at block 802 a probability value is assigned to a network communication parameter or an independent aspect of the information or network communication. The probability value assigned is based on a verification of the network communication parameter or independent aspect of the network communication or message against a profile of acceptable or legitimate behavior for the user. Hence the higher the probability values of the network communication parameters of the network communication, the better the chances that the network communication is legitimate. Here the network communication can be in the form of data, voice, video or the like. The network communication parameters of the network communication may be grouped into a set of probabilistic test functions with probability values p1, p2, p3, p4 . . . pn. These test functions can be designed such that they represent mutually independent network communication parameters or properties of the network communication so that the total probability of the network communication X being legitimate, P(X), is the multiplication of the probabilities of each network communication parameter x1, x2, x3 . . . xn of X, where P(X)=p1(x1)*p2(x2)* . . . pn(xn)*. The network communication parameters can include character, character length, parameter type and the like. In one embodiment, the allowed character of the network communication parameter is independent of the character length but it can be dependent of parameter type, which is another test for the network communication parameters. An example of a parameter type is (integer, e-mail). In this case weighted average of the test scores can be performed rather than product of the scores.

The following describes how probability can be assigned for each network communication parameter, for example, character. Divide characters into groups and assign probability values for each pair of group. One example of an algorithm that can be used, for example, during Validation is described as follows:

The purpose of this algorithm can be to give score to the characters (character groups) of given network communication parameter against profile created for this parameter.

character group matrix (global):

| j | i A | B | C |
|---|---|---|---|
| A | 1.0 | 0.5 | 0.9 |
| B | 0.8 | 1.0 | 0.9 |
| C | 0.6 | 0.6 | 1.0 |

Note:
A, B, C represent character groups
i (first row) - represents given character groups that are calculated from characters of parameter value that is validated.
j (first column) - represents allowed character groups (those that were learnt)

char group prob table (generated for parameter):

| char group | prob |
|---|---|
| A | 1.0 |
| B | 0.095 |
| C | 0.075 |

Let's say value BCCA is given, meaning there are 2 characters that belong to the character group C, one character that belongs to character group B and one character that belong to character group A.
probA=probability of characters from character group A
probB=probability of characters from character group B
probC=probability of characters from character group C
We calculate probability for each character group:
probA=max(probA, matrix[A,B], matrix[A,C])
probA=max(1.0, 0.5, 0.9)=1.0
probB=max(probB, matrix[B,A], matrix[B,C])
probB=max(0.095, 0.8, 0.9)=0.9
probC=max(probC, matrix[C,A], matrix[C,B])
probC=max(0.075, 0.6, 0.6)=0.6
total score=probA*probB*probC=1.0*0.9*0.75=0.675

For example, consider a test function for length which assigns a probability value to a length parameter of the information and another test function which assigns probability value to the appearance of certain characters in the test. The probability that the information is legitimate will depend on the text of the information being at the right length and also with the right characters. In one embodiment, this probability can be stated as $P(\text{legitimate information})=P1(\text{legitimate length})*P2(\text{legitimate character})$ where P, P1, P2 are probability functions between 1 and 0. In another embodiment the probability can be stated as $P(\text{legitimate information})=\Sigma(\text{weight(test)}*P(\text{test}))/\text{weight(test)}$ Where, weight (test)=is the weighted average of the test score, P (test)=validation test probability.
wherein the probability value of the entire message is the weighted average of probabilities.

It is clear that increasing the number of test functions used to determine the probability of the network communication reduces the probability of the network communication being legitimate. However, the test functions described here do not follow a standard distribution function. Rather, the test functions are designed so that whenever the probability value of the test function is within an acceptable or unacceptable range it receives a probability value of '1' or zero. Typically a '1' represents an acceptable range while a '0' represents an unacceptable range. Thus if a test function gets a probability value of '1' it does not affect the overall probability value of the message as demonstrated in FIG. 15.

FIG. 6 is an example of a profile base or profile of acceptable behavior of "parameter value length" test. Column 1 represents the length values received over a period of time and column 2 represents the frequency of appearance of a particular length value. A profile base can be created by building test functions or statistical functions by first accumulating historical values in a profile base and then creating a probability function based on the profile base. FIG. 7 is a table illustrating a probability function based on the profile base of "parameter value length" test according to an embodiment. Column 1 represents a range of length values, column 2 represents a probability value of the ranges and column 3 represents a score assigned to the ranges based on their probability values.

Various embodiments of this process can be implemented in the DMZ of FIG. 1. In this example the profiles are built by a generation process. During generation, ranges of length values will be created, with each range assigned a probability value as illustrated in Table 2. Based on the probability value of the range, each range will be assigned a score of '0' to '1'. The score is also a probability value. For example, all ranges with a probability value over a threshold probability value will get a score of 1, while all ranges with a probability value less than the threshold probability value will get a score that equals to their probability. In addition the threshold probability value can be a range of probability values. If a probability value falls outside the threshold range an analysis is done to determine the appropriate probability value between '0' and '1' to assign. Then an assessment to determine whether the information is legitimate based on the probability values of the different test functions is made. The test functions and screening threshold are built such that a message will never be rejected by falling into the uncertain range of a single test function. At least two are required. However, the more information, for example data, is aggregated, the more certain we are about the normal and abnormal areas and the smaller the uncertain zone becomes. This strongly reduces the likelihood of false positives.

Below are some examples of other tests used within the framework. The framework, however, is not limited to this set. Any tests that follow the independence or other requirements can be added and any irrelevant test can be removed.

Parameters Count Test: This test examines the counts of given parameters according to their statistical appearances. This test covers cases of attempts to plant foreign parameters that contain attack data as script, database queries, etc.

Parameters Order Test: This test examines the order of URLs parameters while also distinguishing between new and old parameters. Most of the sites keep the parameters order. This test covers cases where the parameters order is significant.

Parameter's value Length Test: Lengths are checked here as individuals and not as ranges. This test covers cases where parameters value lengths are discrete and not range (e.g. can be in length of 1 or 3 but not 2.)

Parameter's Characters Frequency Test: This test examines the parameters value in character level. The frequency of each character is learned and statistical calculations are done. This test covers cases where parameter's value consists of specific characters like country code: i101 (the character 'a' is invalid although it is a textual character. If this character had checked according to characters group test it would have been accepted as valid).

Figure 14:
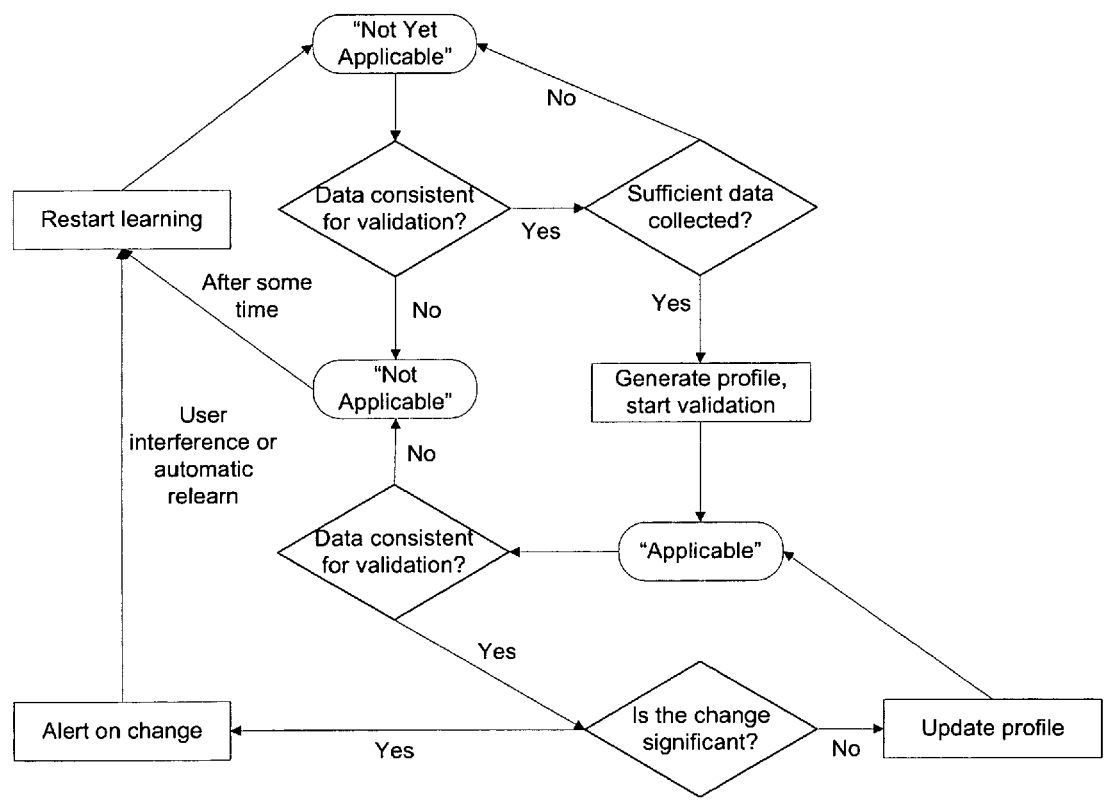
FIG. 14 is a flowchart of continuous learning process according to an embodiment.
Figure 18:
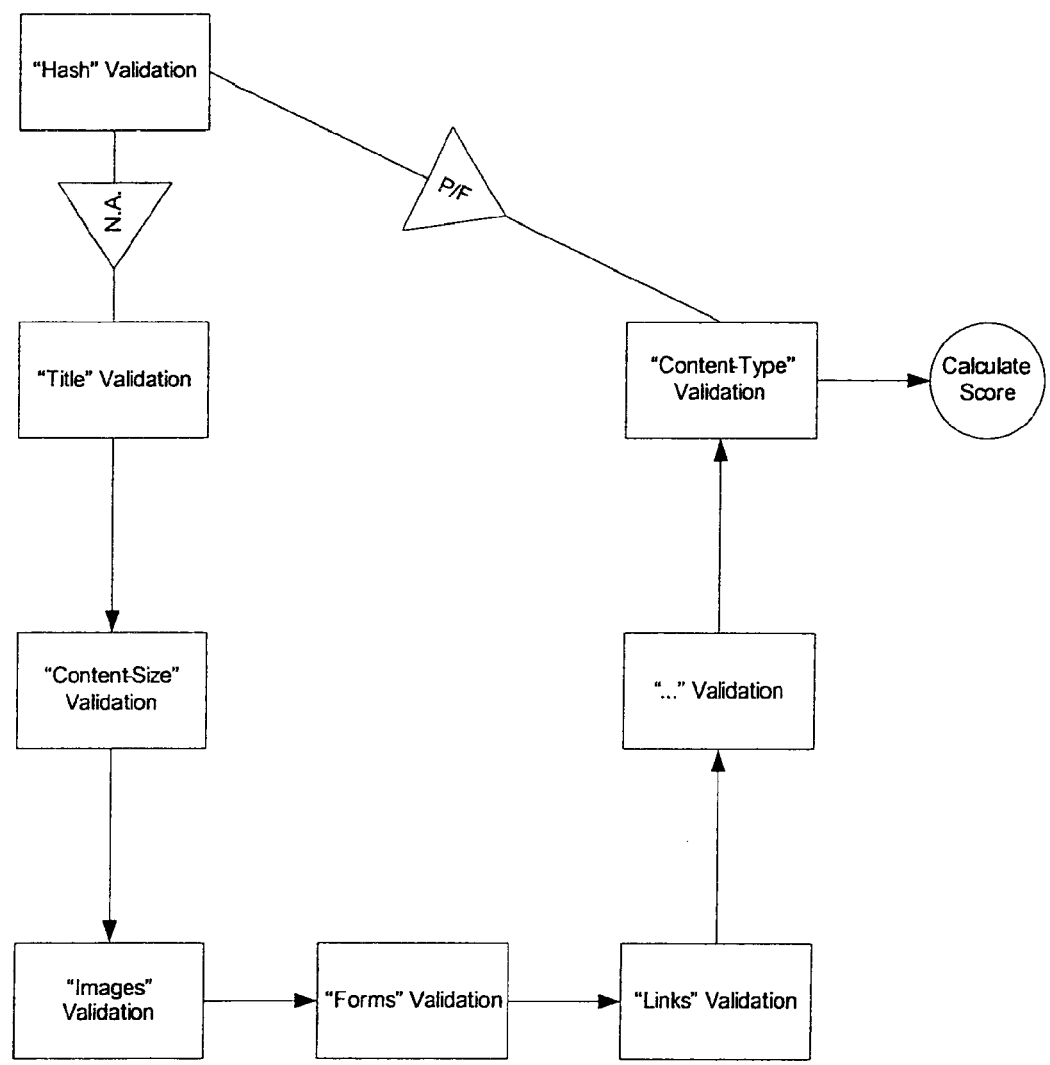
FIG. 18 is a flow chart illustrating a fingerprint validation process according to an embodiment.

Continuous Learning: A serious problem of statistical learning is the difficulty in adapting to changed conditions without losing the ability to detect malicious attacks. Statistical abnormalities are typified by being different than previously observed and do not have, many times, special properties other than that. For example, if the character 'a' did not appear in a certain parameter for a large number of readings, it is assumed the probability of it appearing is very low. If the application has changed such that the character 'a' is now a valid option, the system is likely to quarantine it. A special case of this is when the value is recognized as a part of a closed list like the months abbreviations (Jan, Feb . . . ). In such a case, it is likely that a certain value will be the only value for a long time (a month, say) and then replaced completely. Special amendments are done to recognize and treat this case. Here, we discuss the more general case when a list cannot be detected. (See FIG. 14 for an example of a continuous learning process.)

When a value is new and is not part of recognized list, a rejection (false positive) is almost inevitable. One way to overcome this is by cross checking the request and reply couple together. If the probability of the reply to be legitimate is very high then it is very likely the request is legitimate as well. However, in many cases, changes will occur in both. Because there are no connections between the monitoring application and the actual monitored application, in case of such a change, the system needs to adapt quickly to the changed condition while still not accepting malicious data as legitimate. The continuous learning mechanism has three functions, namely, i. building a first profile, ii. tightening an existing profile, and iii. replacing an existing profile.

Figure 8:
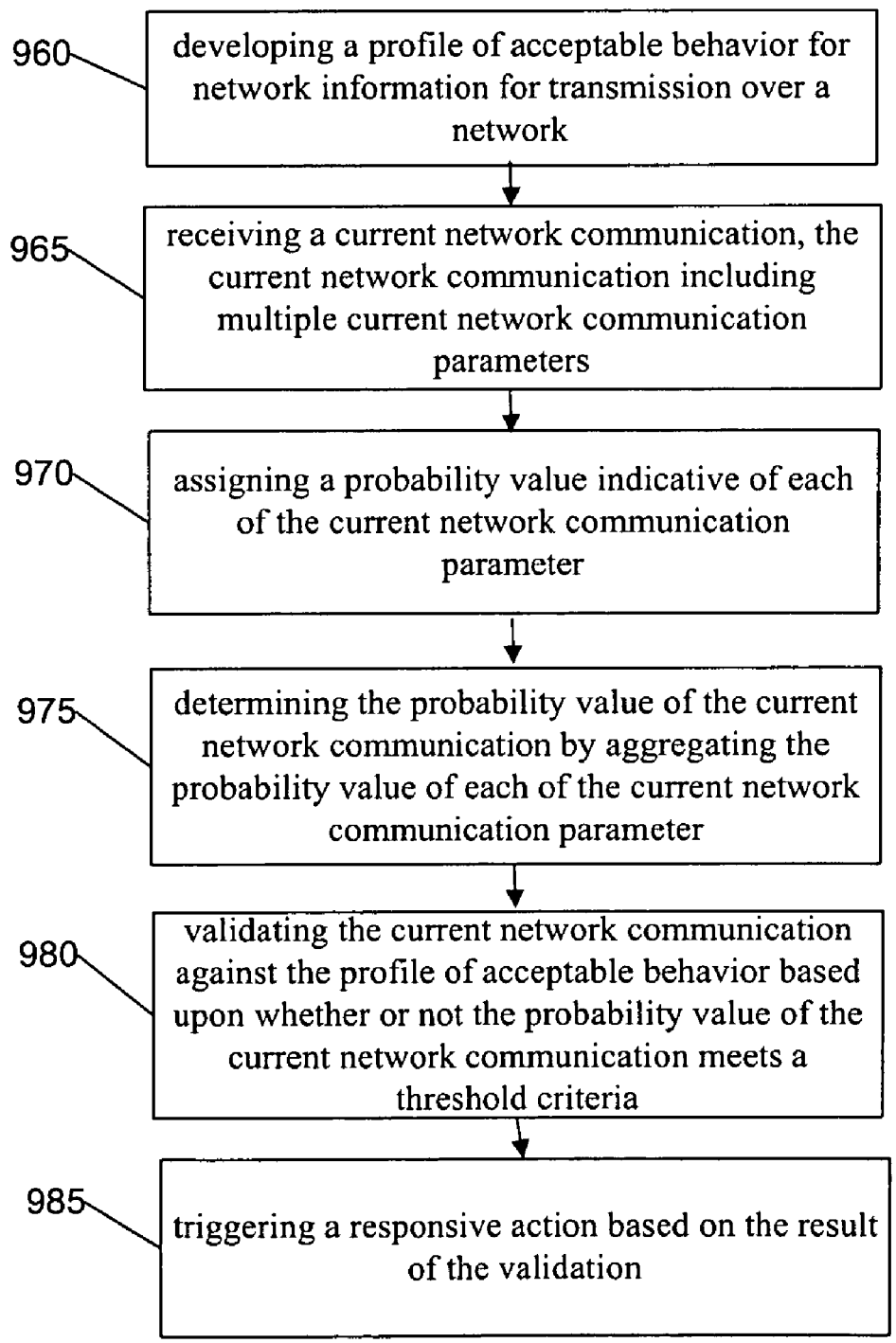
FIG. 8 is a flow diagram of a method for profiling acceptable behavior of a user of a network application according to an embodiment.

FIG. 8 is a flow chart of a method for profiling acceptable behavior of a user of a network application according to an embodiment which is more generalized than the embodiment described in FIG. 4. However, various steps of FIGS. 4 and 8 can be substituted for each other. At block 960 the process starts with developing a profile of acceptable behavior for network communication for transmission over a network. The profile of acceptable behavior includes probability values of network communication parameters developed from a collection of historical network communication. At block 965 a current network communication is received where the current network communication includes multiple current network communication parameters. Each of the current network communication parameters is independent of the other. The process then continues to block 970 where a probability value indicative of each of the current network communication parameter is assigned to the current network communication parameter. The probability value is based on a comparison of each of the current network communication parameters against the profile of acceptable behavior. At block 975 the probability value of the current network communication is determined by aggregating the probability value of each of the current network communication parameters. Then at block 980, the current network communication is validated against the profile of acceptable behavior based upon whether or not the probability value of the current network communication meets a threshold criteria. Finally at block 985 a responsive action is triggered based on the result of the validation. In one embodiment, the method further comprises storing the current network communication in a buffer until enough data has been accumulated for the current network communication to be statistically valid. In other embodiments, the method further comprises merging the current network communication to the profile of acceptable behavior when the current network communication meets the threshold criteria.

The merging of the current network communication parameters to the profile of acceptable behavior can be accomplished using the following techniques described below. In one embodiment, the profiles can be built by a generation process in the dynamic profiling module 204 and/or the adaptation module 50, for example. Different algorithms, for example merge algorithms, can be used to run the generation process and compare data or network communication in, for example main collection of data or network and current collection of data. Main collection of data can be defined as data that has been collected over a long period of time that represent the profile of acceptable behavior, while current collection of data is data that may have been recently collected, for example, in the last few hours. The current collection of data can also be referred to as quarantine data. The merge algorithms can be configured to determine whether the current collection of data matches the main collection of data. The current collection of data can be incorporated into the main collection of data provided it meets the test standard and accordingly will become incorporated into a new test standard. Another attribute of the algorithms is to detect a change, for example, to detect when the data of a test standard has drastically changed. Examples of merge algorithms include the following:

Boolean merge—used to merge tests that have a True/False result. Examples: empty value allowed in parameter, zero value allowed in parameter, multiple appearances of network communication parameter allowed in the request, content size of the reply is allowed to be empty, etc.

Algorithm:

If the value is TRUE in both current collection & main collection, value remains TRUE.

If the value is FALSE in both current collection & main collection, value remains FALSE.

If the value is FALSE in main collection & TRUE in current collection—merge algorithm fails and change detection is declared. Value remains FALSE.

If the value is TRUE in main collection & FALSE in current collection—a value can be generated out of both current collection & main collection samples.

If the combined data indicates TRUE, value remains TRUE.

If the combined data indicates FALSE (this means that overtime the test value changed from TRUE to FALSE)—in one embodiment the value is not automatically changed to FALSE, but rather start to relearn the test data from scratch. The relearn process can take 3-8 days; during this time the test will not be applicable.

The reason that a change from FALSE to TRUE causes change detection and a change from TRUE to FALSE does not, is that a TRUE value in the test actually means that FALSE is also allowed (therefore there is no reason to alert the user on change detection). Example: if "empty value allowed" is TRUE then a parameter can be received with an empty value, but can also be received without an empty value. In one embodiment, the Boolean Merge Algorithm generates a value out of current collection according to the following Table 4.

TABLE 4

|  | current | |
| --- | --- | --- |
| main | Value is TRUE | Value is FALSE |
| Value is TRUE | Value stays TRUE | Until now we have seen that value can be TRUE (which also means that FALSE is allowed), now we have seen that value cannot be TRUE. Generate the value out of current + main collections if FALSE, set the attribute to N.A and restart the learning if TRUE => stays TRUE |
| Value is FALSE | Value changed => Change Detection | Value stays FALSE |

Template Merge—the template merge is for merging the fact that a parameter value or network communication parameter matched a known type (template). Example: integer, positive decimal number, negative integer, email, country code, url, etc.

Figure 20:
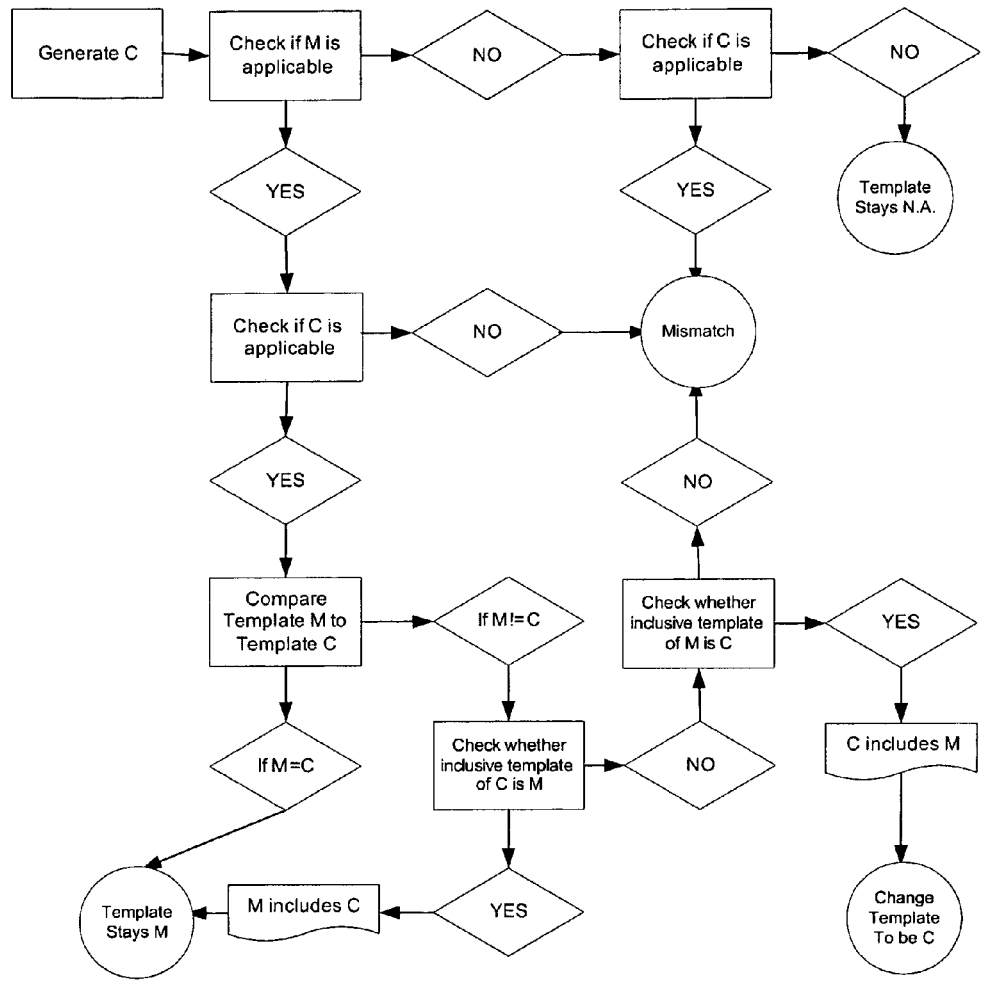
FIG. 20 illustrates an exemplary data flow for the template merger algorithm according to an embodiment.
Figure 23:
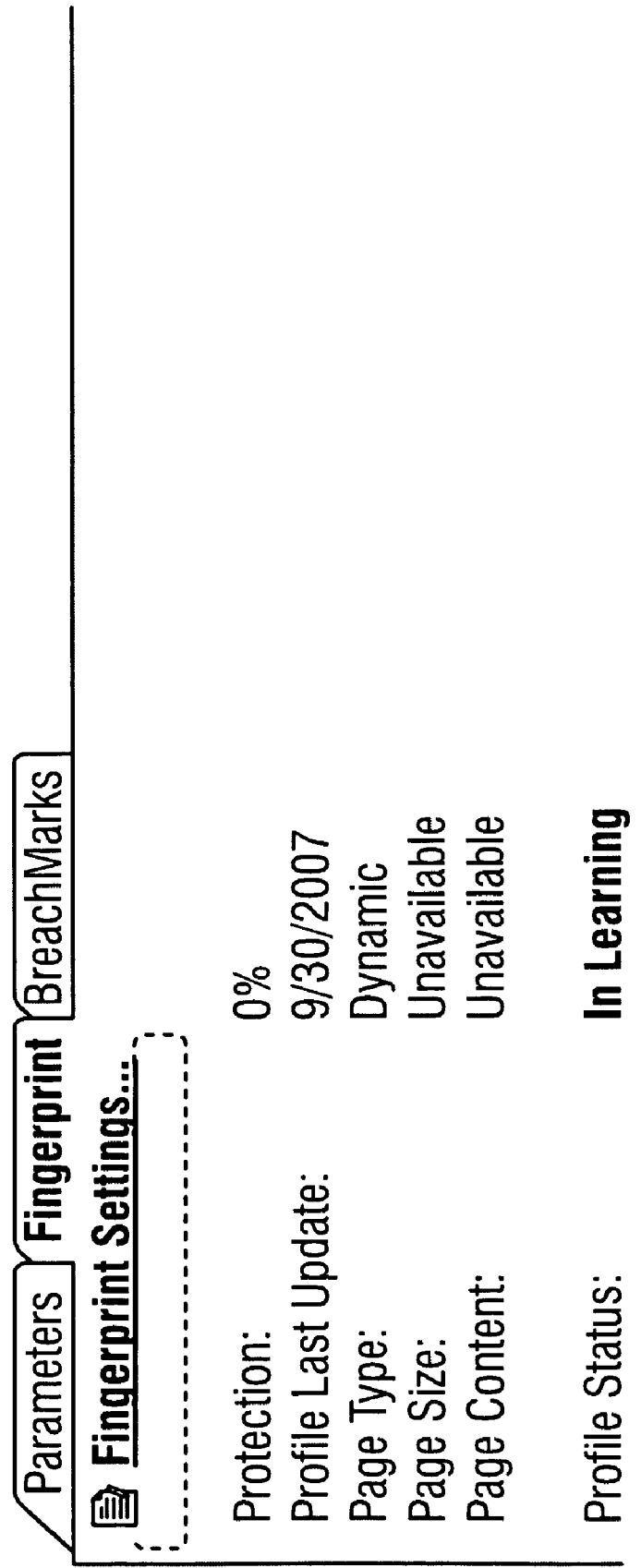
FIG. 23 is a display of an exemplary url exit control according to an embodiment.

In one embodiment the template merger algorithm utilizes 'Inclusive Templates Feature'. FIG. 20 illustrates an exemplary data flow for the template merger algorithm. Where the Template in the main collection is Template M and the Template in the current collection is Template C.

If the type changes from main collection to current collection to a type that is unrelated declare a mismatch and change detection.

If the type changes to a template that is inclusive, such as a change from positive integer to integer (negatives also allowed), automatically adapt and update the type to the type that is more general.

Ranges merge—used for tests that have ranges, such as parameter lengths (an example of a network communication parameter). Here, two algorithms can be used and the combined result of both algorithms can be used to decide whether to accept the current data or not. In one embodiment the tests utilized are: Pearson & Range distance.

Pearson—this is a known statistical algorithm that comparers the distribution of the values and not the values themselves. In one embodiment given data from current collection (X) and main collection (Y) as illustrated in Table 3 below.

TABLE 3

| X | | Y | |
| --- | --- | --- | --- |
| value | N_appear | value | n_appear |
| 1 | 10 | 1 | 100 |
| 3 | 20 | 3 | 150 |
| 4 | 0 | 4 | 5 |

Pearson Coefficient can be calculated according to the following formula:

$$r = \frac{\sum (x-\bar{x})(y-\bar{y})}{\sqrt{\sum(x-\bar{x})^2 \sum(y-\bar{y})^2}}$$

where x is N_appear of current collection, $\bar{x}$ represents mean of x,
y is n_appear of main collection, $\bar{y}$ represents mean of y.

While Pearson decides similarity of distribution of values, it doesn't take into consideration the distance between the values; therefore range distance on the values is performed.

Range Distance—this is an algorithm that can compare the values in both main collection & current collection of data. The idea is to check for every new value, if it is 'close' enough to an existing value. It categorizes the ranges to ATR ranges (ranges that have a high probability to appear) and BTR ranges (ranges that have a low probability). It then checks for each ATR ranges in current collection:

If it appears in main collection as ATR also, accept the value and continue.

If it doesn't appear in main collection as ATR (meaning it appears as a BTR range in main or doesn't appear in main collection at all), we check if there is another ATR range in main collection that is 'close' to it. If such a close value is found, this range is accepted as well.

In one embodiment, if one of the ranges in current is not accepted, declare a mismatch and change detection. Otherwise accept the data and create new ranges from the combined data.

In one embodiment range distance is calculated as follows:

C=element of current collection
M=element of main collection
probC=probability of single entry of current collection, if count/total_count(*)>threshold=>ATR else BTR
probM=probability of single entry of current, if count/total_count(*)>threshold=>ATR else BTR
temp=temporary variable (used in pseudocode)

1. Loop over current collection
    a. If probC=BTR (this element appeared very little in current, we don't care whether it appeared many or little in main; in both cases it is ok)=>continue to the next element
    b. // if we are here probC=ATR (this element appeared a lot in current collection, we require that there will be matching element for C in main collection that is also ATR or at least one that it's value is very close, for example if we have 3 that appears many time in current collection and 3 also appeared many times in main collection, it's ok, if 3 doesn't appear many times in main collection but 2 does and 2 is very close to 3 its also almost ok, on the other hand if the closest element to 3 that appears many times in main collection is 20, this might not be ok)
        i. Find closest element to C in main collection that is ATR and check its distance from C.
           temp=1.0/distance*factor
2. End Loop
3. return lowest temp (*) total_count—count of all values ('other' not included)

List merge—used for network communication parameter values of type list. The main criterion for a list is that the number of distinct values of the parameter does not exceed 30 (configurable). The merge of the list of values in main compared to the list of values in current can accept the following additional conditions:

"No condition"—Merge the lists and accept all new values using only the condition that the total number of values will be, for example, under 30. This criterion can be used only at the beginning when a profile is yet to be built.

"Current in main"—Merge the lists if the number is, for example under 30, AND the values in current are also in main, meaning there were no new values in the last few hours. This criterion can used to verify that a temporary profile is correct.

"Common value"—merge the lists if the number is, for example under 30, AND there are common values in main and current, meaning the lists in main and current are not completely unrelated. This criterion can be used when a profile already exists and there is a need to decide if the new values in current are acceptable or change detection should be declared.

Thus, in addition to checking the condition, a verification that number of total values in current and main collection doesn't exceed the maximum limit for this attribute is also done. Which condition is used depends on the age and applicability of the attribute. For example, If attribute is applicable (APL) we will use "common value" condition, meaning we require that current collection and main collection will have at least one common value.
   1. if "common value" condition exists
      i. (*) if number of total values in current and main doesn't exceed the maximum limit for this attribute=>return MATCH
      ii. else return RELEARN
   2. if "common value" condition doesn't exist=>return MISMATCH.

Figure 9:
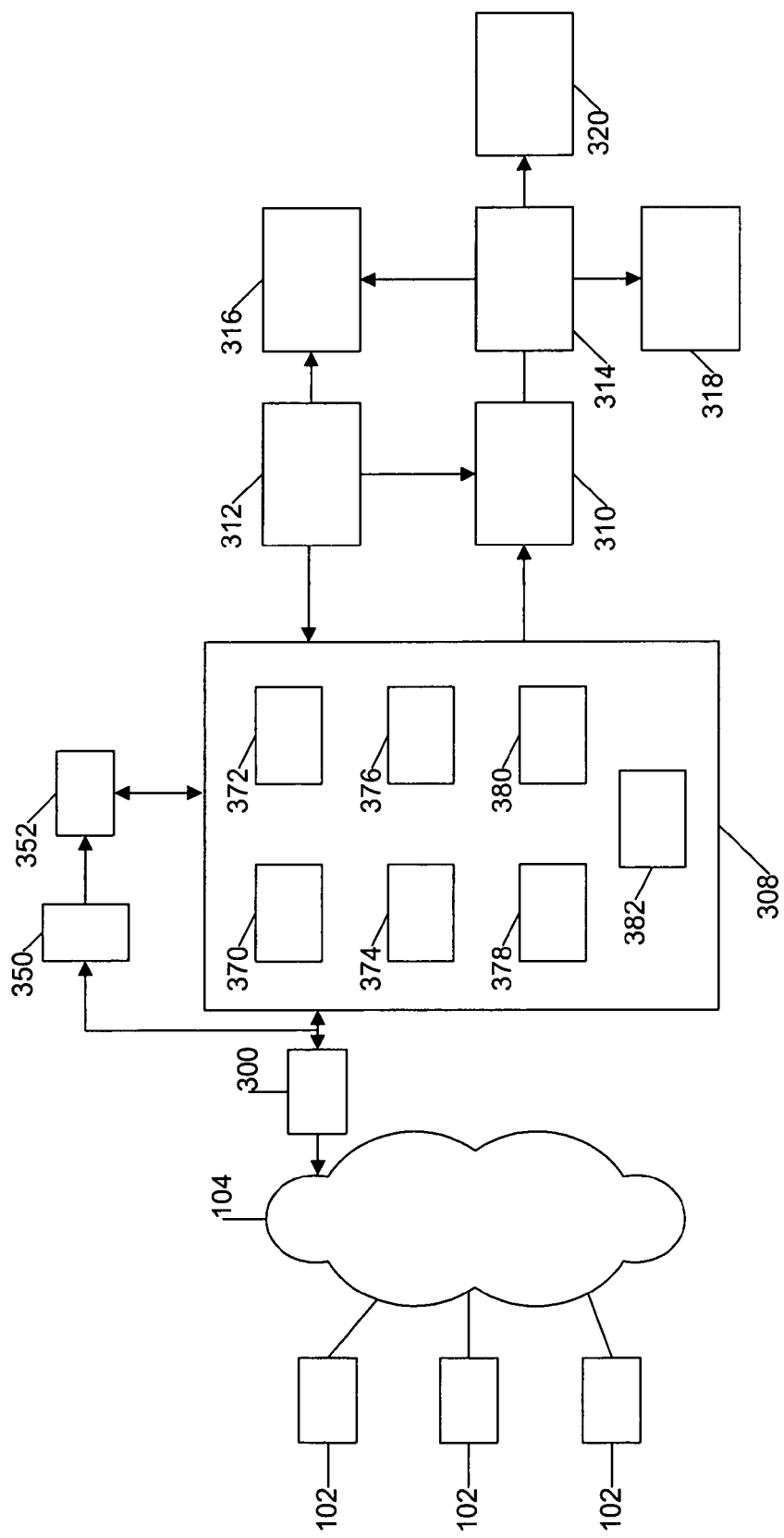
FIG. 9 is a block diagram of illustrating an embodiment of an exemplary system which is used to describe an exemplary dataflow in a Web application security technique as may be performed by the Web application protection module of FIG. 1.

If attribute is not yet applicable (NYA)
   If attribute's age is less then minimum learn time we will use "no condition", meaning in case that attribute is less them minimum time in the system we don't require any special condition for merging the value.
      1. (*) if number of total values in current and main doesn't exceed the maximum limit for this attribute=>return MATCH
      2. else return RELEARN.
   If attribute's age is more then minimum learn time we will use "current in main" condition, meaning we are 'ready' to generate if current is included in main.
      1. if "current in main" condition exists
         a. (*) if number of total values in current and main doesn't exceed the maximum limit for this attribute=>return MATCH.
         b. else return RELEARN
      2. if "current in main" condition doesn't exist=>return MISMATCH (*) whether total number of values exceeds or not the maximum limit allowed for this attribute is calculated as follows:
   1. if number of values (without 'other')<maximum limit
      a. if count of values (with 'other')*(1-ref)<=count of values (without 'other')=>pass
      b. else=>fail
   2. fail FIG. 9 is a block diagram of illustrating an embodiment of an exemplary system which is used to describe an exemplary dataflow in a Web application security technique as may be performed by the Web application protection module of FIG. 1. As illustrated in FIG. 9 multiple users 102 are in communication with a wide area network 104, such as the Internet. The users may desire to access a Web application. Typically, a user will access a Web application with web traffic using SSL encryption. A SSL decryption module 306 can passively decrypt the traffic to allow visibility into any embedded threats in the web traffic. The web traffic then flows to a collaborative detection module 308 where the traffic is analyzed in the context of appropriate application behavior compared to the applications' security profile. If an anomaly is discovered, it is passed to one or more of the multiple threat-detection engines included within the collaborative detection module 308. The results from the collaborative detection module 308 are communicated to an Advanced Correlation Engine (ACE) 310 where it is determined the threat context and to reduce false positives. In addition, the collaborative detection module 308 monitors outbound traffic as well as inbound traffic to prevent data leakage such as Identity Theft.

Advanced Correlation Engine

In one embodiment, the ACE 310 includes a first input adapted to receive threat-detection results and to correlate the results to determine if there is a threat pattern. The ACE 310 also includes a second input adapted to receive security policies and to determine an appropriate response if there is a threat pattern. The ACE also includes an output adapted to provide correlation results to an event database 314. The correlation engine examines all of the reference events generated by the detection engines. This can be viewed as combining positive (behavior engine/adaption) and negative security models (signature database) with other specific aspects to web application taken into account (session, protocol). As an example consider a typical SQL Injection; at least one if not two behavioral violations will be detected (invalid characters and length range exceeded) and several signature hits will occur (SQL Injection (Single quote and equals) and SQL Injection (SELECT Statement). Any one of these events on their own will typically be a false positive, but when correlated together, they may provide a high likelihood of an actual attack.

Another example of the correlation engine is seen when the security system is deployed in monitor only mode and an actual attack is launched against the web application. In this example, the security system will correlate the Exit Control engine events (outbound analysis) with the inbound attacks to determine that they were successful and escalate the severity of the alerting/response.

If the ACE 310 confirms a threat, then the security policy for the application, which is provided by a security policy module 312, is checked to determine the appropriate responsive action. The ACE 310 may also communicate its results to the event database 314 where the ACE results are stored. The event database 314 may also be in communication with a distributive detect prevent architecture (DDPA) module 316.

As shown in FIG. 9, the responsive action may be provided to the DDPA module 316 by the security policy module 312. The DDPA module 316 may also receive information from the ACE 310 via the event database 314. The DDPA module 316 may, for example, alert, log, or block a threat by coordinating distributed blocking with a network component, not shown, such as a firewall, Web server or Security Information Manager (SIM).

The event database 314 may also be in communication with an event viewer 318, such as a terminal, thereby providing information about events to a network administrator. The event database 314 can also communicate input to a report generating module 320 that generates reports about the various events detected.

Adaption Module

An adaption module 350 monitors Web traffic and continually updates and tunes a security profile module 352 that maintains security profiles of applications. The updated security profiles are communicated to the collaborative detection module 308 so that a current security profile for an application is used to determine if there is a threat to the application. Following is a more in-depth description of aspects and features of the Web application security techniques.

Passive SSL-Decryption

It is estimated that up to fifty percent of network traffic is currently using SSL for secure communications. While necessary for secure data transit, SSL also enables hackers to embed attacks within the SSL and thereby avoid detection at the network perimeter. Through visibility into the SSL traffic an application may be afforded protection. It is preferred to provide passive SSL decryption without terminating the SSL session. The decrypted payload may be used for attack analysis only, clear text is not enabled for the internal LAN and non-repudiation is maintained for the SSL connection. An example of passive SSL decryption can be found in co-pending U.S. patent application Ser. No. 11/325,234, entitled "SYSTEM TO ENABLE DETECTING ATTACKS WITHIN ENCRYPTED TRAFFIC" filed Jan. 4, 2006, and assigned to the assignee of the present application.

As noted the adaption module 350 monitors Web traffic to develop and maintain a profile of an applications. In one embodiment, the adaption module 350 includes an input that is adapted to monitoring traffic of users as the user interacts with a Web application. The adaption module 350 also includes a profiler adapted to identify interaction between the user and the application thereby determining a profile of acceptable behavior of a user while interacting with the application. During an initialization period, the adaption module 350 develops an initial profile, then the profile is modified if additional acceptable behavior is identified. For example, as users interact with an application, or if an application is updated or modified, what is acceptable behavior may change. Thus, the adaption module 350 will modify the profile to reflect these changes. The adaption module 350 also includes an output that is adapted to communicate the profile to the security profile module 353. The adaption module 353 process creates application profiles by using an advanced statistical model of all aspects of the communication between the application and the user. This model may be initially defined during a learning period in which traffic is gathered into statistically significant samples and profiles are periodically generated using statistic algorithms. The model may be further enhanced over time and periodically updated when changes are detected in the application. This model can include validation rules for URLs, user input fields, queries, session tracking mechanisms, and components of the http protocol used by the application.

Management Console

Figure 10:
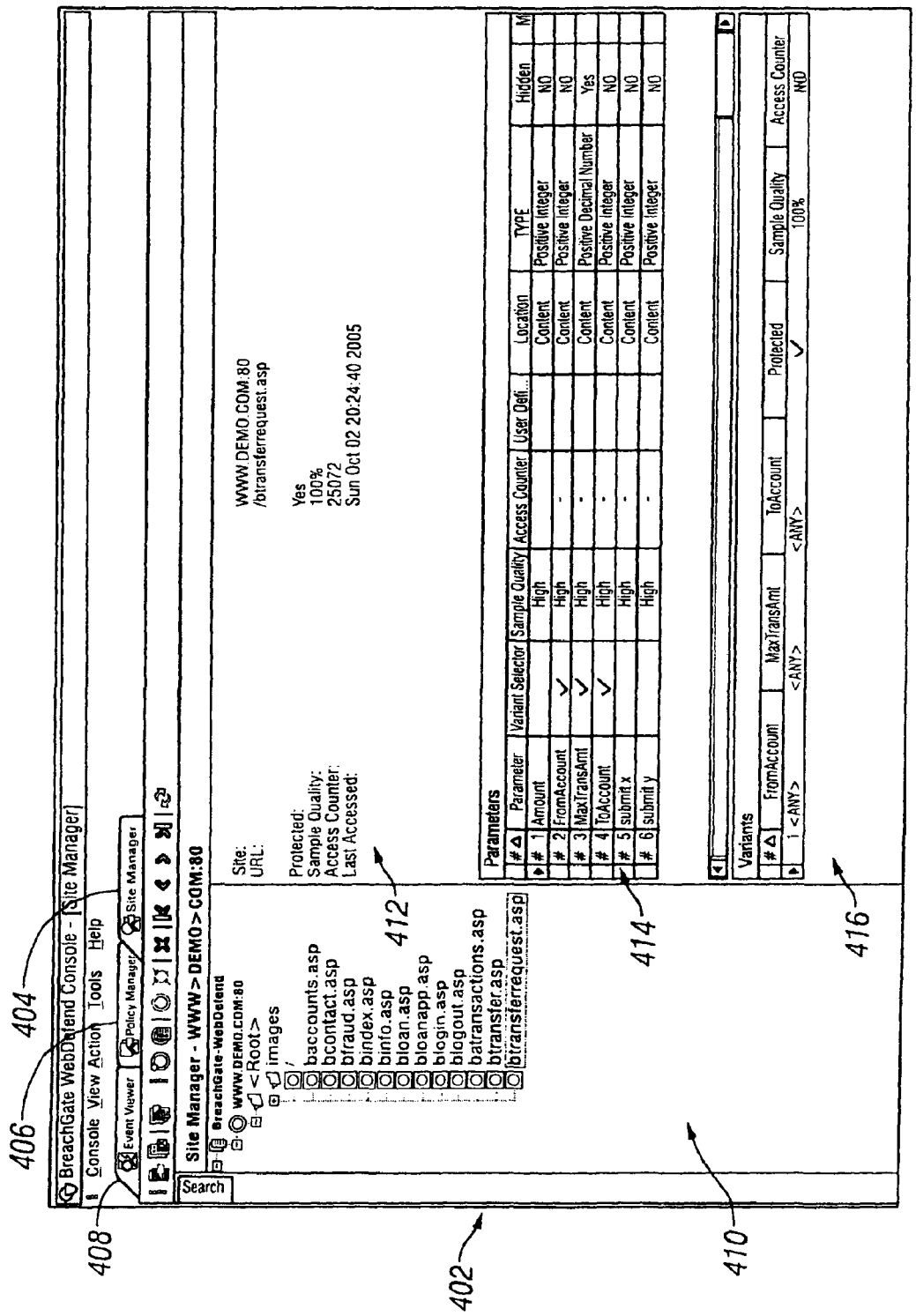
FIG. 10 is a display of an exemplary site manager display generated by the manager console, designed to enable interaction with the application profiles according to an embodiment.

A management console can be used to generate displays of information to a network administrator on an event viewer 318 of FIG. 9. FIG. 10 is an exemplary display 402, generated by the management console, designed to enable intuitive application security management. As shown in FIG. 10, the display 402 generated by the management console can include tabs for a site manager 404, a policy manage 406, and an event viewer 408. In FIG. 10, the site manager tab 404 has been selected. The site manager display 404, generated by the management console, provides a user interface for interacting with an application's profile, as developed and stored in the adaption modules 350 and application profile 352 of FIG. 9. The site manager display 404 depicts an application's security profile or model in a hierarchical tree structure. Nodes on the tree represent URL's within the application profile.

The site manager display can also include a directory window 410 allowing the network administrator to navigate through the application profile. The directory window 410 can be a site map organized in a hierarchy to provide an intuitive interface into the organizational structure of the web application.

The site manager display also includes a status window 412 where information about the status of the Web application protection system is displayed. The Status Window 412 can display the status of the attack detection engines and performance and access statistics.

There is also a parameters window 414 the status of various parameters of the Web application protection system are displayed. The parameter window 414 can list each user entry field or query in the selected URL. Each parameter entry includes the quality of the statistical sample size for this field, validation rules for determining the correct behavior of user entries in the field, and other characteristics.

In one embodiment, the site manager display can also include a variants window 416 where information about variants that are detected can be displayed. In another embodiment, the site manager displays response window (one per URL). The variant window 416 can list the response pages possible through various valid combinations of user parameters selected in the request. For example, if a page had a list of products user could select, the page would have variants for each different possible product in the list. Variants include information used to uniquely identify the response page. FIG. 15 is a table illustrating an example of score calculation for single test ("parameter value length" test) according to FIG. 10.

Figure 11:
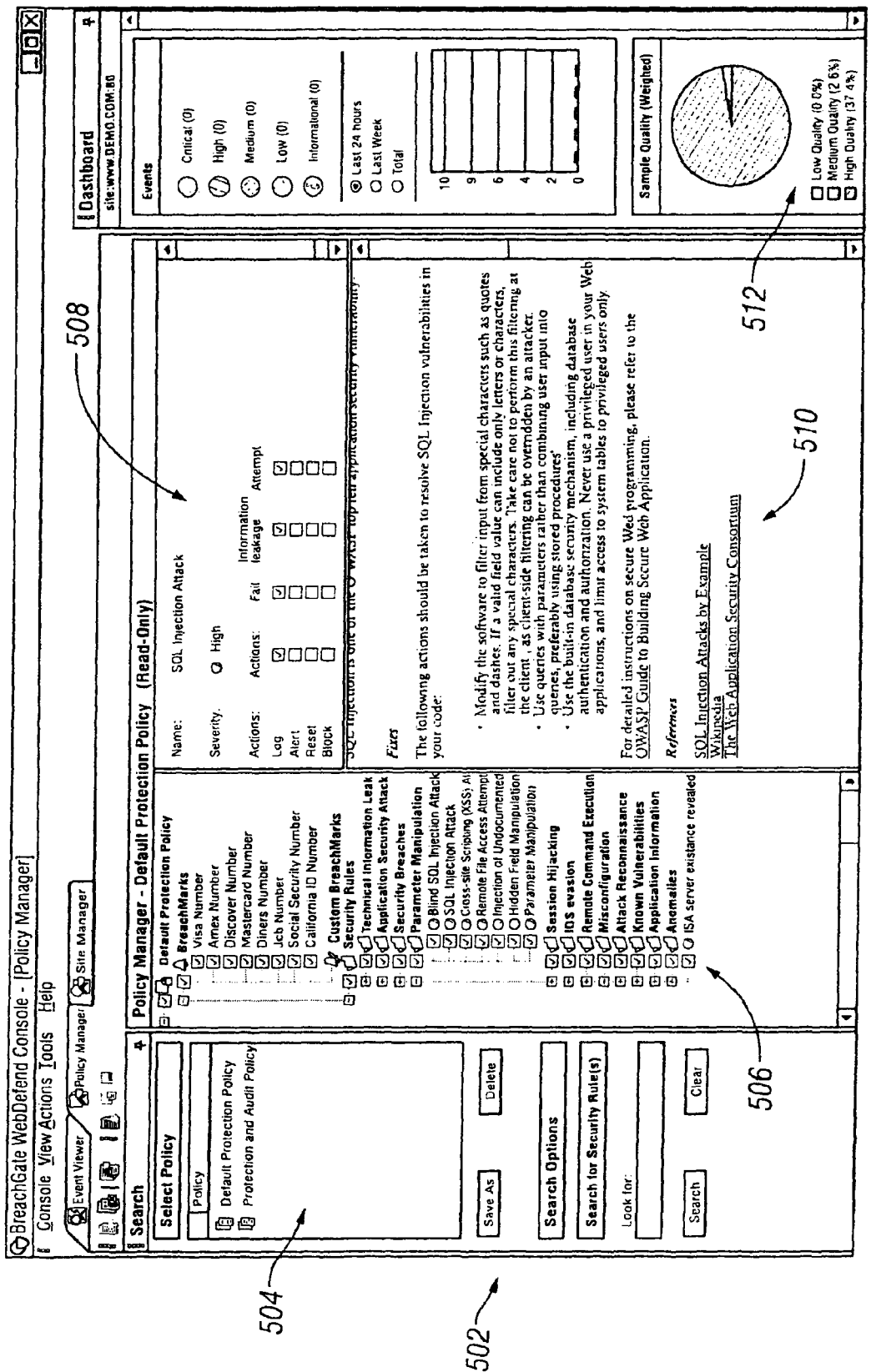
FIG. 11 is a display of an exemplary policy manager display generated by the manager console, designed to enable interaction with the security policies according to an embodiment.

FIG. 11 is an exemplary policy manager display 502 generated by the management console. Within the Web application security system, a policy describes the configuration options for the detection engines as well as what responsive action to take when an event is detected. A policy lists the security events that the Web application security system will monitor and the responsive action to be taken if the event is detected. The policy manager display enables administrators to view and configure security policies for a Web application security system, such as the policies stored in the security policy module 312 of FIG. 9. For example, the policy manager display can provide a list of events organized into categories within a tree structure. Each event may be enabled or disabled and responsive actions for each event can be configured such as logging the event, sending a TCP Reset or firewall blocking command, or setting an SNMP trap.

Policies can be standard, out-of-the-box, policies that are configured to provide different levels of protection. Administrators can modify these standard policies in the Policy Manager to create application-specific policies. In addition, administrators can design their own policy from scratch.

The Web application security system can include special patterns, referred to as BreachMarks, that are used to detect sensitive information such as social security numbers or customer numbers in outgoing Web traffic. The BreachMarks, which can be included in the security policies, can be customized to a particular data element that is sensitive to an enterprise's business. BreachMarks allow organizations to monitor and block traffic leaving the organization which contains patterns of data known to represent privileged internal information.

The policy manager display 502 can be used to define and manage the configuration of the Web application security system mechanisms and includes the ability to fine-tune threat responses on a granular level. As shown in FIG. 11, the policy manager display includes a policy window 504 where a network administrator can select a desired policy for use by the Web application security system. The policy manager display 502 also includes a navigation window 506 so that different types of security issues can be tracked and monitored. There is also a policy modification window 508 that allows an administrator to set various responses to a security attack. In the example of FIG. 11, the administrator is able to set how the Web application security system will respond to an SQL injection attack. The policy display 502 also includes a recommendation window, where suggestions for how to modify a network's operation to better prevent attacks are provided. There is also a dashboard window 512 that provides the administrator summary information about the types and severity of various events identified by the Web application security system.

Figure 12:
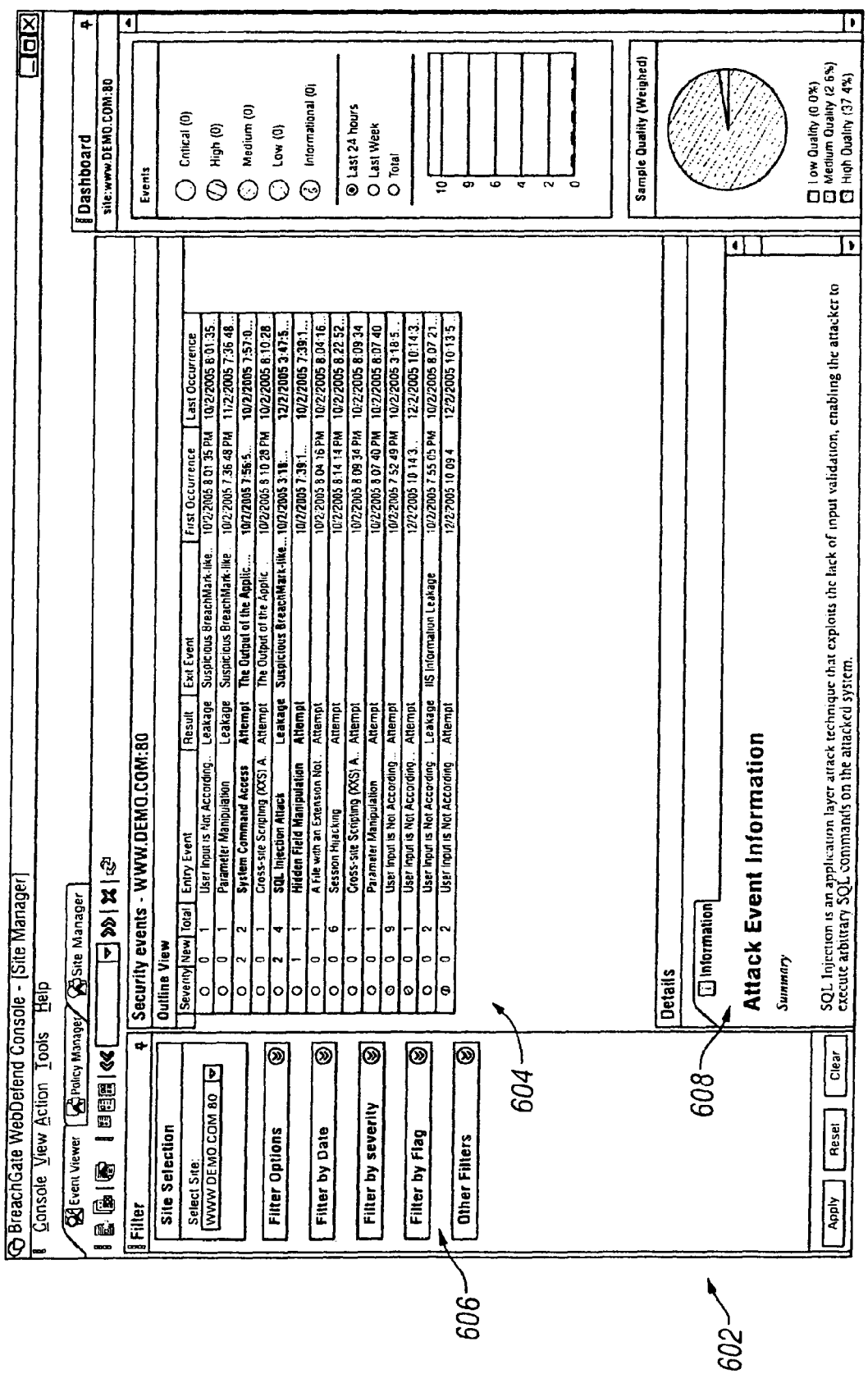
FIG. 12 is a display of an exemplary event viewer display generated by the manager console, designed to enable interaction with the detected security events according to an embodiment.

FIG. 12 is an exemplary event viewer display 602, generated by the management console, as might be displayed on the event viewer 318 of FIG. 9. Within the Web application security system, the event viewer display 602 console can include a real-time event analysis module. The event viewer display 602 includes an event detection window 604 with a list of events detected by the Web application security system. This list may include the date, the URL affected, and names both the entry event for the incoming attack as well as any exit event detected in the server's response to the attack.

In section 606, each selected event may be described in detail, including an event description, event summary, and detailed information including threat implications, fix information, and references for more research. In addition, the event viewer may provide administrators a listing of the reference events reported by the detection engines to determine this event has taken place, the actual HTTP request sent by the user and reply sent by the application, as well as a browser view of the response page. This detailed information allows administrators to understand and verify the anomaly determination made by the various detection engines.

The event viewer display 602 can also include a filter window 606 where an administrator can setup various filters for how events are displayed in the event description window 604. There is also a detail description window 606 where detailed attack information is provided to the administrator. The event filter display 602 may include filters for date and time ranges, event severity, user event classifications, source IP address, user session, and URL affected.

Returning to FIG. 9, the Web application security system can also provide a full range of reports 320 for network administrators, management, security professionals, and developers about various aspects of the security of a Web application. For example, reports can provide information about the number and types of attacks made against corporate Web applications. In addition, reports can include information with lists of attacks and techniques to assist in preventing them from occurring again. Also, application developers can be provided reports detailing security defects found in their applications with specific recommendations and instructions on how to address them.

Collaborative Detection Module

The following discussion provides additional detail of the collaborative detection module 308 illustrated in FIG. 9. As noted in the discussion of FIG. 9, web traffic flows to the collaborative detection module 308 where the traffic is analyzed. The traffic is analyzed by a behavior analysis engine 370 in the context of appropriate application behavior compared to the applications' security profile. If an anomaly is discovered the traffic is passed to one or more of the multiple threat-detection engines included within the collaborative detection module 308. The multiple threat-detection engines work synergistically to deliver comprehensive Web application protection that spans a broad range of potentially vulnerable areas. By working together the multiple threat-detection engines are able to uncover threats by analyzing them in the context of the acceptable application behavior, known Web attack vectors and other targeted Web application reconnaissance.

Behavioral Analysis Engine

The behavioral analysis engine 370 provides positive validation of all application traffic against a profile of acceptable behavior. A security profile of acceptable application behavior is created and maintained by the adaption module 350 which monitors Web traffic and continually updates and tunes a security profile module 352 that maintains the security profiles of applications. A security profile of an application maps all levels of application behavior including HTTP protocol usage, all URL requests and corresponding responses, session management, and input validation parameters for every point of user interaction. All anomalous traffic identified by the behavioral analysis engine 370 is passed to one or more threat detection engines to identify any attacks and provide responsive actions. This ensures protection from all known and unknown attacks against Web applications.

Signature Analysis Engine

One threat detection engine in the collaborative detection module 308 can be a signature analysis engine 372. The signature analysis engine 372 provides a database of attack patterns, or signatures, for known vulnerabilities in various Web applications. These signatures identify known attacks that are launched against a Web application or any of its components. Signature analysis provides a security context for the anomalies detected by the behavioral analysis engine 370. When attacks are identified they are ranked by severity and can be responded to with preventative actions. This aspect of the Web application security system provides protection from known attacks against Web applications, Web servers, application servers, middleware components and scripts, and the like.

Protocol Violation Engine

The collaborative detection module 308 can include a threat detection engine referred to as a protocol violation engine 374. The protocol violation engine 374 protects against attacks that exploit the HTTP and HTTPS protocols to attack Web applications. Web traffic is analyzed by the behavioral analysis engine 370 to ensure that all communication with the application is in compliance with the HTTP and HTTPS protocol definitions as defined by the IETF RFCs. If the behavioral analysis engine 370 determines that there is an anomaly, then the traffic is analyzed by the protocol violation engine 374 to determine the type and severity of the protocol violation. The protocol violation engine 374 provides protection against attacks using the HTTP protocol, for example, denial of service and automated worms. Session Manipulation Engine.

Session Manipulation Analysis Engine

Another threat-detection engine that can be included in the collaborative detection module 308 is a session manipulation analysis engine 376. Session manipulation attacks are often difficult to detect and can be very dangerous because cybercriminals, such as hackers, impersonate legitimate users and access functionality and privacy data only intended for a legitimate user. By maintaining all current user session information, it is possible to detect any attacks manipulating or hijacking user sessions, including session hijacking, hidden field manipulations, cookie hijacking, cookie poisoning and cookie tampering. For example, a state tree of all user connections may be maintained, and if a connection associated with one of the currently tracked sessions jumps to another users session object, a session manipulation event may be triggered.

Cookies

Cookies are the applications way to save state data between 2 separate Http request/replies. The server sends a set-cookie header in its reply & the client send back a cookie header in the following requests. It is expected that the cookie header will appear in the request with a value that is equal to the value of the matching set-cookie header that appeared in the previous server reply. When receiving a server reply, the parser will find all the "set-cookies" headers in it. These will then be stored in the session storage by the system. When receiving the following request, the parser will find all the "Cookie" headers in it. During the system validation of the request, the cookie headers received will be compared to the "set-cookie" in the session storage.

The system validation will be separated into minimal validation and regular validation. The minimal validation occurs when a cookie has low Sample Quality (the process of learning the cookies has not completed yet). During this time, the cookie will simply be compared to the set-cookie and an event will be triggered if they do not match. In addition, the fact that the two matched or not will be learnt as part of the system collection/adaption process. After enough appearances of the cookie, the generation will turn the cookies' certainty level to high and mark if the cookie needs to be validated or not. Once the cookie's Sample Quality turns to high, it will be validated only if it was learned that the cookie value matches the set-cookie that appeared before.

Hidden Fields

In certain Url (source Url) the HTML form tag <form> can appear with specific action that points to other Url (target Url)<form action="target_url">. Target Url can be reached for example when pressing the "submit" button from the source Url. On the source Url as part of the <form> various HTML controls (input fields) can appear. These input fields have attributes that describe their type and value. This data will be sent to the target Url in the form of parameters clicking the submit button, i.e. the fields of the source Url are parameters of the target Url.

Some fields of the Url are displayed by the browser for the user to fill with data; then when pressing the submit button, a request for the target Url is generated, while passing these fields as parameters. Examples for such fields are: name, age, date. Other fields may be of type "hidden" and have a value set for them by the server when the reply page is sent; this means that these fields are not displayed by the browser and the user does not see them. However, these fields are also sent as parameters to the target Url. The value sent together with the hidden parameters is expected to be the same value which the server sent in the reply of the source Url. Examples for such fields can be: product-id, product-price.

Another type of input fields that can be mentioned is "password". These fields are displayed to the user, which fills them with data. Browsers do not show the value of password type parameters when it is entered and show "***" instead. It is expected that parameters that are of type password will also have another attribute in the source Url reply: autocomplete=off (meaning, the browser cannot use the auto complete feature and save previous values entered to the field).

In some cases, client side scripts, such as java scripts, can modify the value of the hidden field. In these cases, even though a field is marked as hidden its value does not match the expected one. When receiving a reply, the system searches for target Url forms with hidden fields. It will save data on the hidden fields of each Url and their expected values in the session storage. During the Adaption, once the target Url is accessed, the ALS will check if the value of the hidden fields matches one of the expected values stored earlier. While generating a policy for a parameter, the system will check if the field was learned as a hidden field enough times and decide if this field is to be validated as a hidden field or as a regular parameter. During the validation, values of parameters that are validated as hidden fields will be compared to the values that were retrieved earlier and were stored in the session storage.

As part of this processing, recognizing fields as password types is also supported. The fields will be recognized as password type during the parsing of the. If a field was learned as type password enough times it will be marked as such. Fields of type password will be generated as bound type parameters with their lengths and char groups. The system is alerting when a field in the target Url is marked as password type, but the auto-complete flag for it is not turned off.

Passive Session Tracking

A predefined list of regular expressions that can identify session IDs in requests and replies is defined. A generation process will choose a subset of these session ID definitions as the ones that are used to identify sessions. These session IDs will be searched for in all requests and replies. The session IDs will be extracted from the request using a combination of the request's objects (such as cookies, parameters, etc), and general regular expressions that are used to extract specific session data. Each set of regular expressions defines which part of the request it runs on, and can be used to extract a value and optionally extract up to two names. In addition, if the regular expression is being searched for in the URL, it can also extract the indexes of an expression that needs to be removed from it. Regular Expression Sets can have one of the following types:

1. Param: Includes two regular expressions. One is searched for in the parameter name, and the other in its value.
2. WholeCookie: Includes two regular expressions. One is searched for in the cookie name, and the other in its value (the entire cookie value, without additional parsing).
3. CookieParam: Includes three regular expressions, and works on cookies that have been separated correctly into names and values. The first expression is on the cookie's name, the second—on the cookie's parameter name, and the third on the cookie parameter's value. For example, in the cookie header: "Cookie: mydata=lang=heblsessionid=900" the cookie's name is "mydata", the two parameters are "lang" (with the value "heb") and "sessionid" (with the value 900).
4. SemiQuery: Includes one regular expression that is run on the query that comes after a semicolon. For example, in the URL "/a.asp;$jsessionid$123", the regular expression will run on the underlined part.
5. NormURL: This regular expression runs on the normalized URL. It may return indexes, in which case the part of the URL that is between these indexes is removed. This is done to support sessions that are sent as part of the URL but should not be included in the URL when it is learnt by the ALS.
6. Header: Includes two regular expressions. One is searched for in the header name, and the other in its value.

Table 1 lists some exemplary definitions of a few regular expression sets that can be used inside the security system.

TABLE 1

Sample Definitions of Expression Sets used in the security system

| Index* | Type | Regular Expressions | Parenthesis | Description |
|---|---|---|---|---|
| 1 | Param | Param Name: (jsessionid) Param Value: (.*) | 1 - Name 2 - Value | Detects the jsessionid parameter. |
| 2 | SemiQuery | \$(jsessionid)\$(.*) | 1 - Name 2 - Value | Detects a less popular variant of jsessionid in the semi-query. |
| 3 | CookieParam | Cookie Name: (.*) Cookie Param Name: (.*session_id.*) Cookie Param Value: (.*) | 1 - $Name_1$ 2 - $Name_2$ 3 - Value | Detects cookies that have parameters that contain the string session_id in their name. |
| 4 | NormURL | \/(\(([^)]*)\)\/) | 1 - Index 2 - Value | Detects URLs with a bracketed session ID (such as /abc/(123)/a.asp) |

*The index is a numeric identifier of the regular expression set.

Usage Analysis Engine

Still another threat detection engine that can be included in the collaborative detection module 308 is a usage analysis engine 378. The usage analysis engine 378 provides analysis of groups of events looking for patterns that may indicate that a site is being examined by a potential attacker. Targeted Web application attacks often require cybercriminals to research a site looking for vulnerabilities to exploit. The usage analysis engine 378, over time and user sessions, can provide protection against a targeted attack by uncovering that a site is being researched, before the site is attacked. The usage analysis engine 378 correlates event over a user session to determine if a dangerous pattern of usage is taking place. An example of this analysis is detecting a number of low severity events resulting from a malicious user probing user entry fields with special characters and keywords to see how the application responds. These events may not raise any alarms on their own but when seen together may reveal a pattern of usage that is malicious. Another example of this analysis is detecting brute force login attempts by correlating failed login attempts and determining that threshold has been reached and thus, the user may be maliciously trying to guess passwords or launching a dictionary attack of password guesses at the web application. Another example of this analysis is detecting scans by security tools when an abnormal amount of requests are received in the same session. Yet another example of this analysis is detecting http flood denial of service attacks when an abnormal number of duplicate requests are received in the same session. This analysis can be easily extended to detect distributed denial of service attacks by boot networks correlating multiple individual denial of service attacks.

Exit Control Engine

Yet another threat detection engine that can be included in the collaborative detection module 308 is an exit control engine 380. The exit control engine 380 provides outbound-analysis of an application's communications. While all incoming traffic is checked for attacks, all outgoing traffic is analyzed as well. This outgoing analysis provides essential insight into any sensitive information leaving an organization, for example, any identity theft, information leakage, success of any incoming attacks, as well as possible Web site defacements when an application's responses do not match what is expected from the profile. For example, outgoing traffic may be checked to determine if it includes data with patterns that match sensitive data, such as a nine digit number, like a social security number, or data that matches a pattern for credit numbers, drivers license numbers, birth dates, etc. In another example, an application's response to a request can be checked to determine whether or not it matches the profile's variant characteristics.

Web Services Analysis Engine

Another threat detection engine that can be included in the collaborative detection module 308 is a Web services analysis engine 382. The Web services analysis engine 382 provides protection for Web Services that may be vulnerable to many of the same type of attacks as other Web applications. The Web services analysis engine 382 provides protection from attacks against Web services such as XML viruses, parameter tampering, data theft and denial of Web services attacks.

Threats detected by any of the above threat detection engines in the collaborative detection module 308 are communicated to the advanced correlation engine 310 where they are analyzed in context of other events. This analysis helps to reduce false positives, prioritize successful attacks, and provide indications of security defects detected in the application. In one embodiment, the advanced correlation engine 310 can be based upon a positive security model, where a user's behavior is compared with what is acceptable. In another embodiment, the advanced correlation engine 310 can be based upon a negative security model, where a user's behavior is compared to what is unacceptable. In yet another embodiment, the advanced correlation engine 310 can be based upon both models. For example, the user's behavior can be compared with what is acceptable behavior, a positive model, and if the behavior does not match known acceptable behavior, then the user's behavior is compared with what is known to be unacceptable behavior, a negative model.

The results from the collaborative detection module 308 are communicated to the advanced correlation engine (ACE) 310 for further analysis of events. Examples of some types of analysis performed by the ACE 310 can include the following.

In one embodiment, one type of analysis that can be performed by the advanced correlation engine 310 is an analysis to determine if there is a change in the number of events produced for a page. One technique for recognizing a change in a Page (URL) is based on the number of events produced for the URL as well as on the event rate. Unlike a 'Simple Change Detection feature' where the change is detected when event rate has changed, the Application Change Detection takes into consideration the ratio between total number of events for a specific URL and number of requests.

In one embodiment, a system assumes that application browsing profile, that is the amount of resource hits, might change during the day and week. As a result, the number of events, including false-positives, produced during the day or week might change. When detecting a change, the system assumes one of the following scenarios, and supports both:

a. The nature of the application was not changed, meaning that the application is expected to be browsed at the same rate and profile like it was before the change.

b. The browsing profile has changed, which includes the peak time.

When the system starts its operation, no Change Detection is searched for. Once an Initial Adaption period is completed, each URL learnt initiates its "adjustment period", where it calculates the allowed event rate for each URL per time slot. The event rate limit for each URL is generated at the end of the "adjustment period." The "adjustment period" can be defined, for example, by the number of successful generations performed. In one embodiment, any URL that arrives after the Initial Period is over will immediately enter its "adjustment period." In other embodiments, a URL that arrives after the Initial Period is over will enter its "adjustment period" at a desired time.

When a change is detected an event should be triggered. Only events with status codes that are not error status codes contribute to the calculating event rate, otherwise the request is likely to be an attack, not an application change. Typically, events can be partitioned into the following groups:

a. Event on unexpected URL—Once most of the application resources were browsed the number of these events is expected to be significantly low. Incremental change in the number of this event should indicate that additional resources, such as files, were added to the application. It is noted that typically, this type of event can be only be monitored on the Application Level.

b. Events on unexpected resources (Parameter, Variant)—Once most of the application resources were browsed the number of such events is expected to be significantly low. Incremental change in the number of such events should indicate that additional resources were added to the application.

c. Events on entry policy violation—These events might result from bad policy, attack, or application change. In this case, an application change refers to changing values of parameters, their number of appearance, or their location within the request.

d. Events on exit policy violation—These events might result from bad policy, application change, or attack. Application change refers to replacing a static content with another (hash fingerprint), or changing the reply structure (in case of dynamic content, identified by other fingerprints). An attack is less common in this case. Attacks that result with patterns violation should rarely happen, while attacks that successfully replaced a page with another can be identified as a valid change (unless a fine-grained correlation is supported).

e. System Limitation (Parser) or Application Limitation (HTTP Constraints) events—These events don't result from application change, therefore are not used for the calculation.

f. Any Header Related Event (Unexpected Header, Invalid Header Length)—It is assumed that any violation of headers policy or any new header learnt have nothing to do with any application change. Besides, when a user takes action to clear the Application or URL he does not expect the Headers policy to be cleared as well.

Calculating Allowed Event Rate

A technique that can be used to establish whether a Page (URL) was changed, is to calculate the allowed event rate for the URL first. The calculation can be based on event rate per time slot relatively to the number of request per time slot. When calculating the allowed event rate per time slot:

a. Only events from the above groups' c and d will be taken into account.
b. If an event on "security signatures" appears in request or reply we will consider the request to be likely an attack and therefore we will not take any events of this request into consideration for calculating allowed event rate. If an event on "non security" signature appears in request or reply we will count the request, but not the event. This assumes that the events of Signatures are divided into "Security" and "Non security" events.
c. Total number of requests per time slot should not include the requests that returned error status codes.

The system is sampling the number of times events (mentioned above) are submitted in order to produce a limit which indicates the expected maximum number of events per time slot, for each URL. Calculating allowed event rate for URL is an ongoing process that continues also after the limit was set for the first time in order to update itself according to the current event rate. The calculation stops if URL/Application change was detected (Detecting Change) and is not restarted until specific reset (User Scenarios).

Generating Allowed Event Rate

Because the security system implements a continuous learning, profiles are expected to be generated along the operation. Since the number of profiles is dynamic and constantly increasing, so does the number of expected false-positive events. In addition, user is expected to fix profiles to reduce the number of false-positives. System should take this assumption into account when generating allowed event rate. The calculation should take into account the number of profiles existed during the sampling. This can be done by normalizing the number of events with the Sample Quality of a URL.

Detecting Change

The system should recognize an application change at both the URL level and Application Level. Once the allowed event rate for URL is generated, the system enters period where it tries to detect any URL change by comparing the calculated event rate to the maximum allowed rate.

1. Change Detection at URL Level
   a. A change should be identified at URL once the event submission rate calculated per time slot for specific URL has changed (increased).
   b. Automatic URL relearning is achieved by a directive in configuration file. Once this directive is on and a change was detected at URL level the URL should be deleted (the learning should restart).
2. Change Detection at Application Level
   a. To establish application change we need to monitor the changes of URLs that belong to the application and new URLs that were added to the application.
   b. A change should be identified once CD_CHANGED_URLS % of URLs were changed or CD_NEW_URLS % URLs were added in last CD_NUM_SLOTS_NEW_URLS slots or both.
   c. A URL is considered new URL, only if it was added to the database, if an event was triggered for 'Unexpected URL' but it was not added to the database due HTTP Constraints Violation this URL will not contribute to the total count of new URLs.

A disadvantage of it is that some new long URL can be added to the application and we will not detect the change. On the other hand if we allow such URLs to be counted, we can face situation that Application will show that new URLs were added but actually no such URLs will be in the system.

Aspects of Correlating ALS and Signatures

Another type of analysis that can be performed by the advanced correlation engine 310 is an analyze events generated by the behavioral system (Adaption), along with the events generated by signatures, are then passed into the correlation system. The signatures events are used to strengthen the severity of the detected anomaly and evaluate their importance and correctness (and vice-versa).

Correlating Attack and Result events

The Correlation module generates two classes of Correlated Event (CE): Attack CE and Result CE. An attack CE is a CE that has been generated by the Request part of the HTTP connection. A result CE is a CE that has been generated by the Reply part of the HTTP connection. Each result CE is part of one result category out of five categories: Success, Fail, Attempt, Leakage and Informative. Events shown to the user can be 1) Attack CE 2) Result CE and 3) couples of two CE: one Attack CE and one Result CE. Table 2 below provides an example of how the Matrix is built.

TABLE 2

Exemplary Attack/Results Matrix

| | Result Category | | | | | | |
|---|---|---|---|---|---|---|---|
| | Success | | Failed | | Leakage | | Attempt |
| Result CE Type / Attack CE Type | Potentially successful | ... | Unsuccessful Attack with Status Code 404 | ... | Leakage of database table information | ... | N/A |
| SQL Injection | | 1. | 2. | 3. | 4. | 5. | 6. |
| System command injection attack | 7. | 8. | 9. | 10. | 11. | 12. | 13. |
| Cross site scripting (XSS) attack | 14. | 15. | 16. | 17. | 18. | 19. | 20. |
| Remote File access | 21. | 22. | 23. | 24. | 25. | 26. | 27. |
| ... | 28. | 29. | 30. | 31. | 32. | 33. | 34. |

Following the Correlation processing, it might be that not all Attacks/Results events falls into the above table. In this case, the following scenarios are also valid:
  a. One Attack CE and Zero Result CE—In this case, the result CE category will be an Attempt but no concatenation will be done in the various description fields.
  b. Zero Attack CE and One Result CE—The 'Event' column will show the result name (usually, it shows the Attack CE name) and description will only contain Result CE descriptions. The result category will be defined by the Result CE Type.
  c. Two Attack CEs and One Result CE—Two couples will be shown to the user: (Attack1, Result) and (Attack2, Result).
  d. One Attack CE and Two Result CEs—Only one attack couple will be shown to the user. The Result CE with the higher severity will be chosen. If both Result CEs have the same severity values, then one Result CE will be picked randomly. The second result will be handled as described in section 2.3.6.2.
  e. Two Attack CEs and Two Result CEs—In this case, two couples will be shown with two different attacks. The Result CE with the higher severity will be chosen for the Attack CE with higher severity. Symmetrically, the Attack lower Severity will be associated with the Result CE with lower severity. If both Result CEs have the same severity values, then each Attack CE will be assigned randomly a different Result CE.
  f. X Attack CEs and Y Result CEs—The Attack and Result CEs will be sorted according to their severity values and the first Attack CE will be associated with the first Result CE, the second Attack CE with the second Result CE.

In another embodiment, the properties of a request+reply, used by exit control engine, are not learned for each URL but for subsets of the requests for each URL. The URL is divided to resources, and properties of the reply are learned for each resource. Each resource is defined by a key, which consists of a URL and the parameters and values of this URL. The process includes the following steps:
  a. Collect data about the requests and replies.
  b. Go over all parameters of the URL. For each parameter decide whether it has a limited (small) number of options. If so, keep the options and give them ID numbers. Otherwise do not keep the options. This is actually done on the fly, during the data collection.
  c. Go over all requests+replies, and calculate the key of each one. The key is a vector that depends on the parameters and their values. The order of the parameters in the key is the same, even if different requests arrive with a different order. The key calculation is done as follows, for each parameter of the URL:
  d. If it does not appear, write 0.
  e. If it appears but the parameter has a large number of options, write 1.
  f. If it appears and has a defined range of options, write the ID of the option that arrived.
  g. Group together the parameters that have the same key (i.e. same url, same parameters and same parameters' values). For each group, learn the following properties of the reply:
  Size.
  Title.
  Patterns (mandatory, forbidden and special).
  Number of images.
  Number of links.
  Number of forms.
  Hash
  Content type When validating a reply, its key is calculated and its properties (size, title, etc) are matched with the properties learned from the other requests with the same key. For example, assume the URL/catshop.cgi can receive the following parameters:
  "product": can be one of the following strings: "catnip", "lasagna", "wool", "mouse".
  "credit_card": can be any credit-card number.
  "quantity": can be "1", "2" or "3".
  "notify": can appear several times, with the following strings:
  "email", "snailmail", "sms", "singing_clown".

In stage 2, the parameters are analyzed:
  "product": Each string gets an ID: "catnip"=1, "lasagna"=2, "wool"=3, "mouse"=4.
  "credit_card": Recognized as a parameter with many changing values.
  "quantity": Each value gets an ID: "1"=1, "2"=2, "3"=3.
  "notify":

Because the parameter can appear several times, there are actually 24 options. If many combinations really appear, there are too many options and the parameter will be recognized as one with many changing values. If only a small subset of the options actually appears, they are listed and given ids. For example, the combination "email", "snailmail" gets the ID 1, and the combination "snailmail", "singing_clown" gets the ID 2.

In stage 3, keys are calculated for all requests. The keys are vectors that contain a value for each parameter, in the same order as above. For example the request "/catshop.cgi?product=mouse&credit_card=1234567890&quantity=2" gets the key: 4, 1, 2, 0. And, the request "/catshop.cgi?product=catnip&notify=snailmail&notify=singing_clown" gets the key: 1, 0, 0, 2. In stage 4, all possible keys have been detected. For each one, the data about the replies is learned.

Learning Parameter Values

There are several techniques for learning a list of values for a given parameter. For example, parameter values may be learned on the fly during the learning period, in order to avoid saving the values of all requests to the database when there are many such values. The output of the process may be used both for exit control and for entry control.

In one example, a table with a desired number of rows and columns may be kept for every parameter. In this example, the table has 30 rows and three columns, the columns are labeled value, appearances and initial. The value column keeps strings (the value of a parameter), the appearances column keeps the number of appearances of this value, and the initial column keeps the date when the value first arrived. The table may initialized with empty rows (appearances=0).

Whenever a value arrives for the parameter, it is searched for in the table. If it is already there, the "appearances" column of its row is incremented by 1. When a value that is not in the table arrives, it is added to the table, replacing the value with the lowest number of appearances (if several values have the same number of appearances, the value that is replaced is the one with the lowest "initial" value). Note that in this example the list has been initialized with 30 values, so there is always a row to replace.

A special case exists with values that are longer than 40 characters. Such values are unlikely to be parts of static lists, so it is not necessary to waste memory on saving them. These values are dropped and not inserted to the table. When they arrive, only the total number of requests for the parameter is increased.

When the learning period is over, the resulting table may be used both for exit and for entry control. The final table can include the same columns as before, and may also include additional columns. In this example, an additional column "probability", has been added which defines the percent of times out of the total number of requests that the value appeared. The probability is calculated by dividing the "appearances" column by the total number of requests ("n_reqs").

Entry Control

In this part of the learning, it is decided whether a parameter can be validated as a list. A "Property ref" is calculated for all the values of the parameter in the table, as it was calculated in the Learning Ranges section. Next, all the values in the table are checked. Values that have a percent that is smaller than the value of property ref are removed from the table. Now, the percent of appearances of values that are not in the table is calculated (1 minus the sum of the percents of all values in the table). If this percent is higher than ref, the parameter isn't learned as a list. Otherwise, the resulting table is kept and used for request validation. Values that do not appear in the table trigger an alert.

Exit Control

Even if the table was learned as a list, it might still be useful to divide replies to URL variants according to the different values of this list. This can happen when the list is very long, for example, more than a length of 30. One technique that can be used to verify that a list can be used for exit-control, is to sum the "probability" values of the 10 values with the highest probability. If the sum is more than 0.8 (80% of the requests used one of these 10 values), them the corresponding rows are selected as the list of values for the parameter. In this case, if more than 10 values appear, the rest of the values are combined as one option ("other"). If the sum of the probabilities was lower than 0.8, the algorithm decides that the parameter can accept many changing values and the list is not used for exit-control.

Distributed Detect Prevent Architecture Module (DDPA)

The Web application security system can also include a distributed detect prevent architecture module (DDPA) 316 for distributed threat management. The DDPA module 318 can allow organizations to manage application security in the same way they presently manage the applications themselves. Because the Web application protection module 128, shown in FIG. 1, is not in-line, it does not interfere with production network traffic to protect the application or to institute alerting or blocking actions. Thus, the DDPA 316 allows organizations to choose a blocking point, and which best-of-breed network-level device to intercept potential threats. For example, the DDPA 316 can use firewall blocking, TCP resets to the Web server, and SNMP to alert a network monitoring device.

As an out-of-line appliance, the Web application protection module 128 is architected to allow for detection of threats within the context of the application, unlike devices designed to be in-line that focus on the network packet level. The Web application protection module 128 can detect potential threats and then work with the appropriate network-level device, such as a firewall to block malicious behavior. Because of its flexibility and ease of management, the Web application protection module 128 provides centralized application monitoring with distributed threat protection.

The Web application protection module 128 provides protection of many threats, including, but not limited to the following list:

1. •SQL Injection
2. •Cross-site Scripting
3. •Known and Unknown Application-Level attacks
4. •Zero Day Attacks
5. •Session Hijacking
6. •Cookie Tampering
7. •Protocol Manipulation
8. •Automated Worms
9. •Attack Reconnaissance
10. •Data Leakage & Identity Theft
11. •XML Parameter Tampering and Data Theft
12. •OWASP Top 10 Security Threats Exemplary Embodiments To illustrate how aspects of the Web application protection system operates, following are descriptions an exemplary prevention of an SQL injection and a Session Hijacking, two of the most common and dangerous Web application targeted attacks.

Preventing a SQL Injection Attack

An SQL Injection is an attack method used to extract information from databases connected to Web applications. The SQL Injection technique exploits a common coding technique of gathering input from a user and using that information in a SQL query to a database. Examples of using this technique include validating a user's login information, looking up account information based on an account number, and manipulating checkout procedures in shopping cart applications. In each of these instances the Web application takes user input, such as login and password or account ID, and uses it to build a SQL query to the database to extract information.

With user credential validation or account lookup operations, one row of data is expected back from the database by the Web application. The application may behave in an unexpected manner if more than one row is returned from the database since this is not how the application was designed to operate. A challenge for a cybercriminal, or hacker, wanting to inappropriately access the database, is to get the Web application to behave in an unexpected manner and therefore divulge unintended database contents. SQL Injections are an excellent method of accomplishing this.

SQL queries are a mixture of data and commands with special characters between the commands. SQL Injection attacks take advantage of this combination of data and commands to fool an application into accepting a string from the user that includes data and commands. Unfortunately, a majority of application developers simply assume that a user's input will contain only data as query input. However, this assumption can be exploited by manipulating the query input, such as by supplying dummy data followed by a delineator and custom malicious commands. This type of input may be interpreted by the Web application as a SQL query and the embedded commands may be executed against the database. The injected commands often direct the database to expose private or confidential information. For example, the injected commands may direct the database to show all the records in a table, where the table often contains credit card numbers or account information.

A technique to protect Web applications from SQL Injection attacks is to perform validation on all user input to the application. For example, each input field or query parameter within the application may be identified, typed and specified in the security profile during the Adaption process. While validating traffic against an application's security profile, all user input can be checked to ensure that it is the correct data type, it is the appropriate data length, and it does not include any special characters or SQL commands. This technique prevents SQL Injection attacks against a Web application by ensuring that user input is only data with no attempts to circumvent an application's normal behavior.

Figure 13:
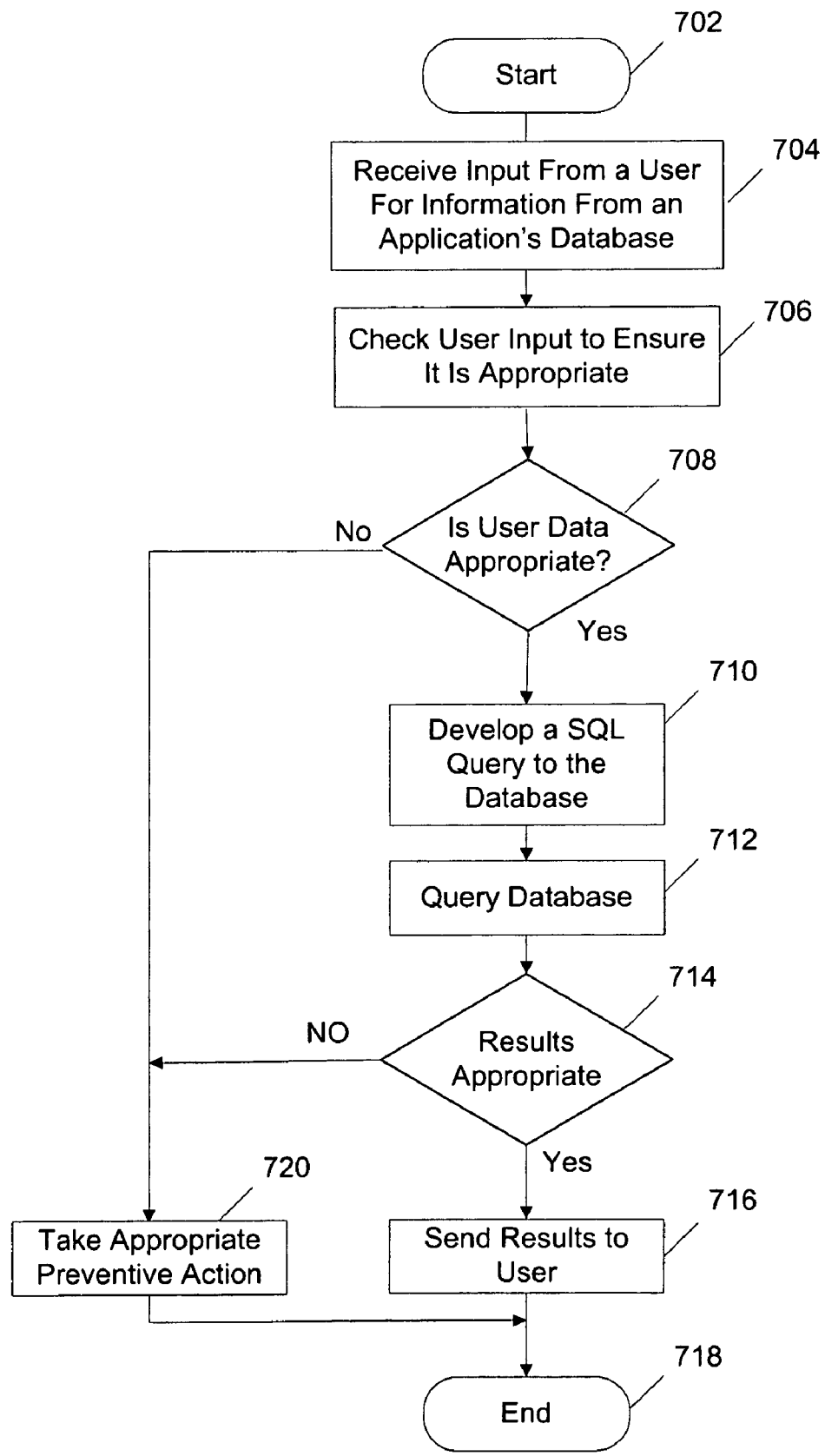
FIG. 13 is a flow chart illustrating an exemplary technique for preventing a SQL Injection attack according to an embodiment.

FIG. 13 is a flow chart illustrating an exemplary technique for preventing a SQL Injection attack. Flow begins in block 702. Flow continues to block 704 where input from a user requesting information from an application's database is received. An example of a user requesting information from a database includes a shopper requesting the price or availability of an item at a shopping web site. Flow continues to block 706 where the user input is checked to ensure that it is an appropriate. For example, each input field is checked to ensure that it is the correct data type, it is the appropriate data length, and it does not include any special characters or SQL commands.

Flow continues to block 708 where it is determined if the user data is appropriate. If the user data is appropriate, a positive outcome, then flow continues to block 710. In block 710 a SQL query to the database using the user input is developed. Flow continues to block 712 where the database is queried. Then in block 714 it is determined if the results returned from the query are appropriate. If the results are appropriate, a positive outcome, then flow continues to block 716 and the query results are sent to the user. Flow continues to block 718 and ends.

Returning to block 714, if the query results are not appropriate, a negative outcome, then flow continues to block 720. Now, returning to block 708, if it is determined that the user data in not appropriate, a negative outcome, flow continues to block 720. In block 720 appropriate preventive action is taken to protect the integrity of the application. For example, the user request can be blocked, or the query results blocked from being sent to the user. A notification can also be logged to indicate that the user attempted to inappropriately access the database, of that what appeared to be a valid user input returned unexpected results from the data base. The notifications can be used to alert a network administrator about questionable behavior by a user. The notifications can also be used in the adaption of the applications profile, as well as updating threat detection engines. For example, a signature analysis engine may be updated to reflect a new attack pattern that the application is vulnerable to. After the appropriate preventive action has been taken, flow continues to block 718 and ends.

Preventing Session Hijacking

Session Hijacking is a method of attacking Web applications where a cybercriminal, or hacker, tries to impersonate a valid user to access private information or functionality. The HTTP communication protocol was not designed to provide support for session management functionality with a browser client. Session management is used to track users and their state within Web communications. Web applications must implement their own method of tracking a user's session within the application from one request to the next. The most common method of managing user sessions is to implement session identifiers that can be passed back and forth between the client and the application to identify a user.

While session identifiers solve the problem of session management, if they are not implemented correctly an application will be vulnerable to session hijacking attacks. Hackers will first identify how session identifiers have been implemented within an application and then study them looking for a pattern to define how the session identifiers are assigned. If a pattern can be discerned for predicting session identifiers, the hacker will simply modify session identifiers and impersonate another user.

As an example of this type of attack consider the following scenario. A hacker browses to the Acme Web application which is an online store and notices that the application sets a cookie when accessing the site and the cookie has a session identifier stored in it. The hacker repeatedly logs into the site as new users, getting new session identifiers until they notice that the ID's are integers and are being assigned sequentially. The hacker logs into the site again and when the cookie is received from the Acme site, they modify the session identifier by decreasing the number by one and clicking on the account button on the site. The hacker receives the reply from the application and notices that they are now logged in as someone else, and have access to all of that person's personal information, including credit card numbers and home address.

To protect against session hijacking attacks, all user sessions may be independently tracked as they are assigned and used. The Adaption process, as performed in block 350 of FIG. 9, can automatically identify methods of implementing session management in Web applications. It is then possible to detect when any user changes to another user's session and can immediately block further communication with the malicious user. For example, once the Session identifiers are learned, the session engine can maintain a state tree of all user sessions correlating the web application session identifiers with tcp/ip session identifiers and can identify when a session attempts to hijack another.

FIG. 17 illustrates the different modes to which an object can be set. Modes are configured on the application level. The object can be referred to as the network communication parameter of the network communication. Once the mode is set for an application, all objects that belong to this application will behave according to this mode. Any change of an object profile or profile of acceptable behavior by the user sets the object (network communication parameter) to user-defined. As a result continuous learning is stopped and any deviation from the profile triggers an event. However, a user defined object can be set back to automatic learning by resetting the profile of that object The learning period can be defined per test (attribute). It is the time it takes the system to generate a profile for that test and begin validating it. An attribute begins its lifetime collecting data until the data collected is sufficient to validate against. Whether the data of each attribute collected is sufficient can depend on the following factors: time since collection has begun, the number of requests and the diversity of the data collected. (The time and the number of request can be configured). In one embodiment, validation of attributes (independent aspects of information) [Are the attributes the same as the independent aspects of the information] begins after learning period of the attribute is over, i.e. 3-8 days and at least 9 requests. After about four days of learning a determination is made as to whether the profile is consistent or solid enough of validation. If the profile is very diverse, meaning it is not consistent for validation, learning continues until the profile is steady. If after 8 days the attribute's profile is still not diverse enough, loose profile for this attribute is generated. Violation of loose profile (as oppose to "normal" profile) must be more severe in order to trigger an event.

Each test (attribute) goes to several stages during its lifetime. FIG. 11 illustrates different stages of a test. Different stages of an attribute show how attribute is constantly learned and updated, therefore defines continues learning of the attribute. Each attribute starts as "not yet applicable". In this stage data for this attribute is being collected and. No validation of this test is performed yet. At any time during the learning period, attributes can become "not applicable" (if system makes decision that the data set is and will not be consistent enough for validation), meaning no validation of this attribute will be performed at all for now being. At the end of learning period attributes become applicable, i.e. validation begins. Once a profile has been learned for an attribute, the profile can then be validated against. The framework will continue to learn this attribute and constantly check if the profile should be slightly updated or alert on a severe change to the profile (continuous learning & change detection). A partially learned profile may be made available, the user is warned of the inadequacy of the profile. Because a profile is constantly updated, when a user views an event in the event viewer, the current profile of the object may not match the profile that triggered an event. This could be overcome by specifying a "last update time" for each profile. In addition to slightly updating the profile for applicable attributes, a mechanism exists that tries to learn again the attributes that were decided to be not applicable in last learning period. Once in approximately 20 days all not applicable attributes become not yet applicable again and they restart their learning period, while at the end of learning period they may become not applicable again or applicable. In one embodiment a generation process decides whether enough information or sufficient data has been accumulated and generates a profile. Different types of data base tables can be maintained for this purpose. For example, a data base table can be maintained to hold all information that was accumulated for certain attribute so far (example Database M). Another data base table can be maintained to hold information that was accumulated for certain attribute during, for example, the last 8 hours. (between 2 generation processes). Accumulation of new information can be done in this data base (example database C). Yet another data base table can be maintained to hold the profile of the attribute (example database V). In one embodiment, the generation process statistically compares information between databases M and C. (various statistical algorithms can be used, each algorithm depends on the nature of the attribute). If it is statistically valid, a profile can be generated into database V. In another embodiment database C can be copied to database M to continue to accumulate data into database C for next 8 hours, for example, where again information is compared and a profile is generated if it is statistically valid.

Figure 26:
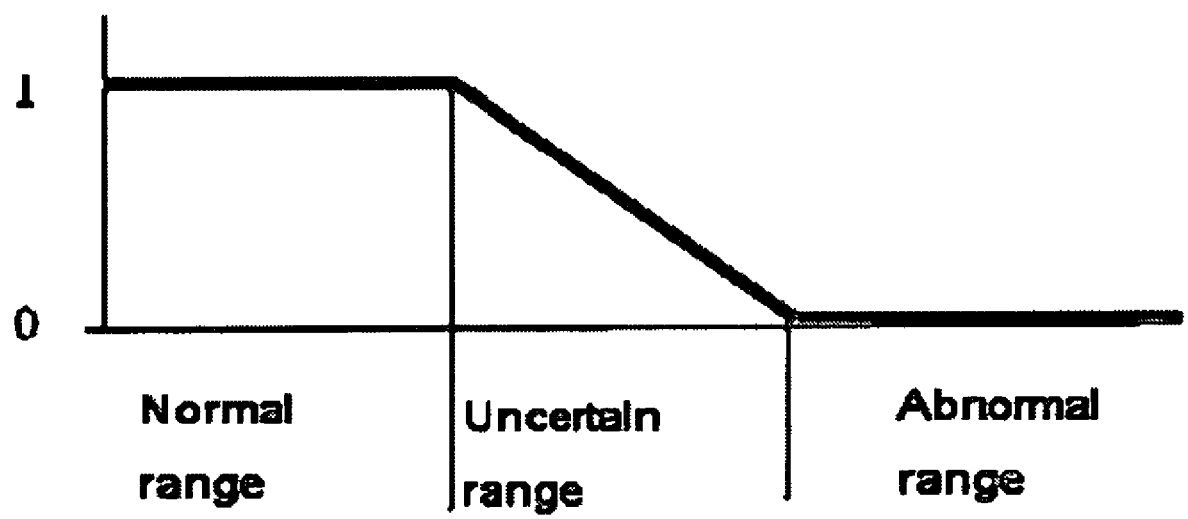
FIG. 26 is an example of a graph showing the probability distribution of test functions according to an embodiment.
Figure 27:
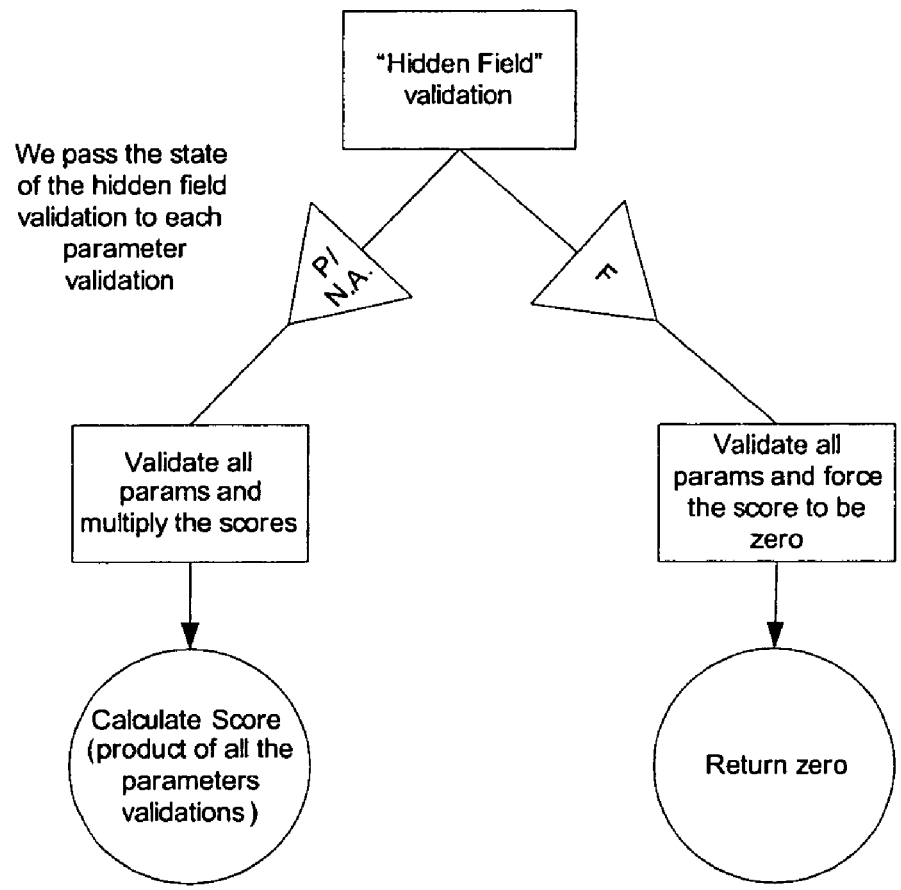
FIG. 27 is a flow chart illustrating a parameter validation process for request according to an embodiment.
Figure 28:
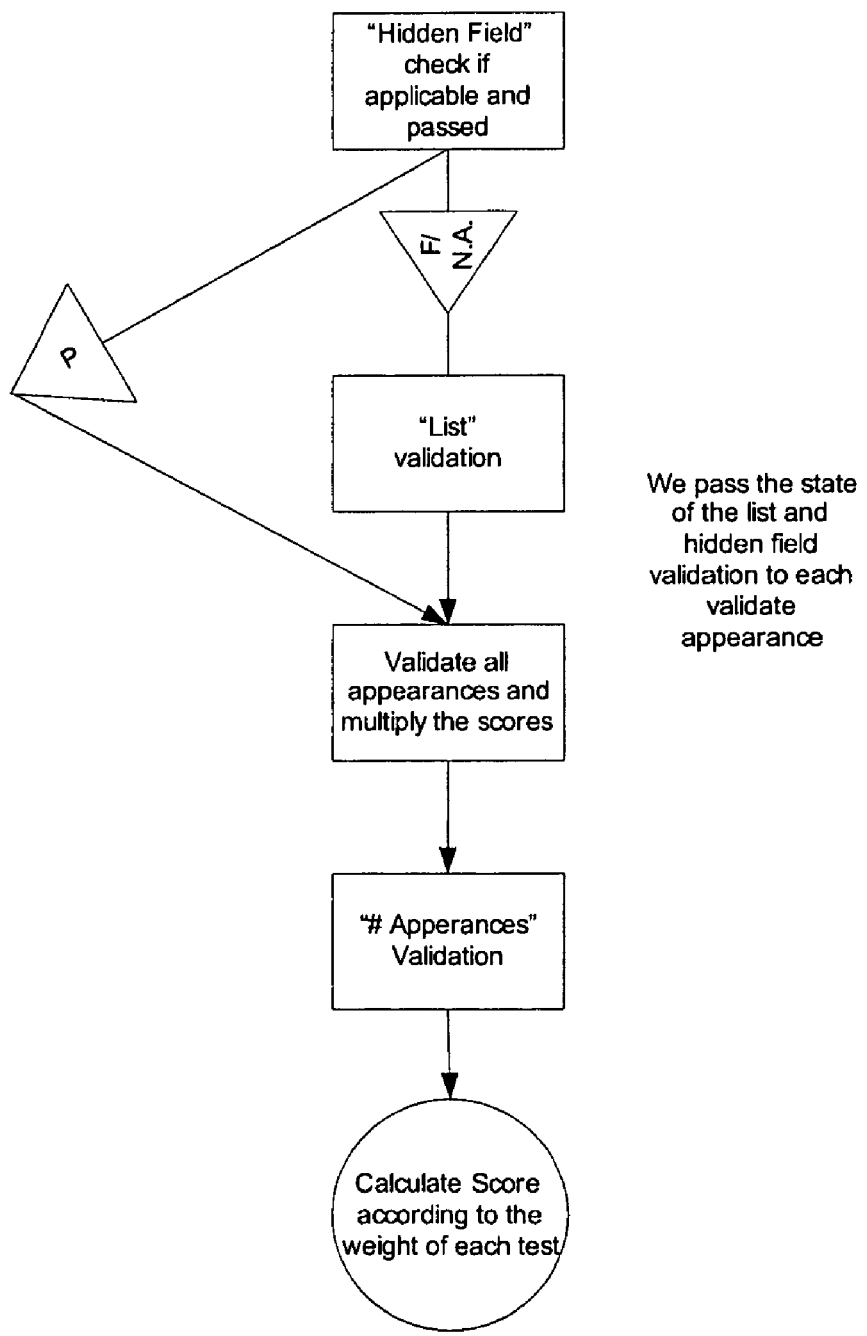
FIG. 28 is a flow chart illustrating a parameter validation process for single parameter according to an embodiment.
Figure 29:
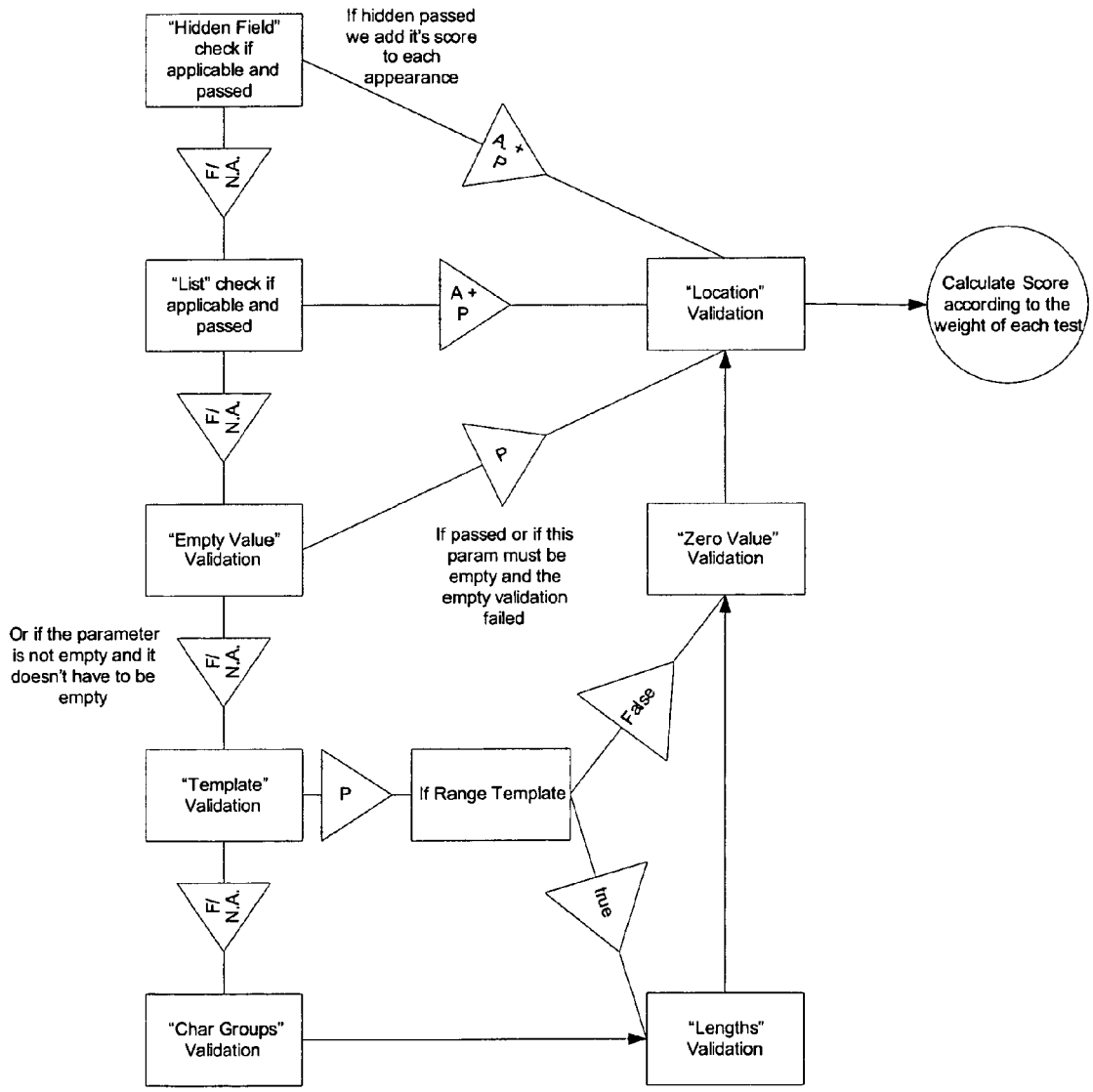
FIG. 29 is a flow chart illustrating a parameter validation process for appearance of single parameter according to an embodiment.

FIG. 26 is an example of a graph showing the probability distribution of test functions. The horizontal axis of the graph shows probability values p ranging from '0' to '1' and the vertical axis represents ranges of probability values including a normal range, an uncertain range and an abnormal range. To illustrate the probability distribution of the test functions, consider for example, the function that determines a character set is legitimate and assume that the information is free text in English. Following the rules of the English language, the letter 'e' will occur with a higher probability than the letter 'q' or 'x'. Although the probability of 'q' or 'x' occurring is rare, the probability of 'q' or 'x' is set to the normal range xxx with a probability value of 1" because we know that this parameter represents a free text in English. Similarly, a word with three 'q' characters in it will be set to the abnormal range xxx and receive a probability of '0' since there are, generally, no such words in English. Other combinations that may be rare but not abnormal are set to the uncertain range and assigned a probability value between '0' and '1'. Thus deliberately manipulated information that do not follow normal use pattern, seemingly innocent information, highly rare messages that can represent attacks or act as 'back-doors' to a network application can be detected. Being statistical in nature, this method of screening predominantly detects abnormal or anomalous information or an innocent mistake, but cannot guarantee that the information is malicious. However, since an innocent mistake, in all likelihood will not lead to a meaningful answer it is generally safe to screen it out.

The framework allows plugging in and out of different test functions that may be relevant to the application in use. For example, consider the flight number parameter field in 'last minute' airline booking agency where the information recorded includes a combination of characters followed by numbers. The actual characters used, however, may change from time to time, according to availability, and some rare combinations may appear. Hence using character test may be meaningless.

The systems and methods introduced here can be implemented in the demilitarized zone (DMZ) or perimeter network area. The demilitarized zone or perimeter network area is a network area that generally sits between an internal network of, for example, an organization and an external network, usually the internet. The DMZ provides additional protection to information contained in the internal network. Examples of components in a DMZ include a firewall that interfaces the DMZ to a wide area network. Data transmitted and received from the wide area network pass through the firewall, through a mirror port to a load balancer that controls the flow of traffic to Web servers. Also connected to the mirror port is a Web application protection module. In particular, the method described here can be implemented in the Web application protection module. As described further below, the Web application protection module monitors traffic entering and leaving the DMZ to detect if the Web site is being attacked. In one embodiment, data transmitted and received from the wide area network pass through the firewall, through a Web application protection module to a load balancer that controls the flow of traffic to Web servers. This configuration without the mirror port where the data traffic goes through the Web application protection module is an in-line configuration. The details of this embodiment and other embodiments are also described below.

Although the description focuses on a non-inline configuration that typically includes a mirror port to incorporate the Web Application protection module into the network, the technique described here is not limited to non-inline configuration. In fact the technique can incorporate other configurations including the in-line configuration.

Those of skill in the art will appreciate that the various illustrative modules and method steps described in connection with the above described figures and the embodiments disclosed herein can often be implemented as electronic hardware, software, firmware or combinations of the foregoing. To clearly illustrate this interchangeability of hardware and software, various illustrative modules and method steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module or step is for ease of description. Specific functions can be moved from one module or step to another without departing from the invention.

Moreover, the various illustrative modules and method steps described in connection with the embodiments disclosed herein can be implemented or performed with hardware such as a general purpose processor, a digital signal processor ("DSP"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor is hardware and can be a microprocessor, but in the alternative, the processor can be any hardware processor or controller, microcontroller. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in computer or controller accessible on readable media including RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent exemplary embodiments of the invention and are therefore representative of the subject matter which is broadly contemplated by the present invention. It is further understood that the scope of the present invention fully encompasses other embodiments and that the scope of the present invention is accordingly limited by nothing other than the appended claims.

The invention claimed is:

1. A computer-implemented method of adapting to changed conditions and analyzing network communication with a web application with respect to a profile of acceptable behavior including probability values of network communication attributes developed from a collection of historical network communication with the web application in order to detect and prevent attacks on the web application, the method where one or more processors are programmed to perform steps comprising:

receiving a plurality of network communications in succession, the plurality of network communications each including a plurality of parameters, each of the plurality of network communications being independent of the next successive network communication;

extracting a plurality of attributes from the plurality of parameters of each network communication;

assigning a plurality of probability values indicative of each of the plurality of attributes of each network communication, the plurality of probability values based on a comparison of each attribute against the profile of acceptable behavior;

augmenting the profile of acceptable behavior based on the comparison of the plurality of attributes against the profile of acceptable behavior for each successive network communication;

receiving a current network communication, including a plurality of current network communication parameters;

extracting a plurality of attributes from the plurality of current network communication parameters;

assigning a plurality of probability values indicative of each of the plurality of current network communication attributes, the plurality of probability values based on a comparison of each current network communication attribute against the profile of acceptable behavior, the plurality of probability values for each of the plurality of current network communication attributes being statistically independent of the plurality of previous network communications attribute probability values;

updating the profile of acceptable behavior based on the comparison of the plurality of current network attributes against the augmented profile of acceptable behavior;

determining an overall probability value of the current network communication based on a calculation comprising the plurality of attribute probability values of the current network communication;

validating the current network communication against the profile of acceptable behavior based upon the probability value of the current network communication and a threshold criteria; and triggering a responsive action based on the result of the validation.

2. The method of claim 1, further comprising:
storing the current network communication in a buffer of a threat detection module until enough data has been accumulated for the current network communication to be statistically valid.

3. The method of claim 2, wherein the current network communication is determined to be statistically valid based on one of time since the collection of the current network communication started, the number of a current inbound communication and a current outbound communication of the current network communication and diversity of the current network communication.

4. The method of claim 2, further comprising:
storing the plurality of network communication attributes in a buffer until enough data has been accumulated for the plurality of network communication attributes to be statistically valid.

5. The method of claim 1, further comprising:
storing the plurality of network communication parameters in a buffer until enough data has been accumulated for the plurality of network communication parameters to be statistically valid.

6. The method of claim 1, further comprising:
merging the current network communication to the profile of acceptable behavior when the current network communication meets the threshold criteria,
wherein the merging the current network communication further comprises executing at least one merge algorithm to incorporate the current network communication into the profile of acceptable behavior.

7. The method of claim 1, wherein the triggering comprises transmitting an alert when the current network communication fails to meet the threshold criteria.

8. The method of claim 1, further comprising:
forwarding the current network communication to an administrator for further analysis when the current network communication fails to meet the threshold criteria.

9. The method of claim 1, wherein the threshold criteria is based on a threshold probability value.

10. The method of claim 1, wherein the threshold probability value comprises a range of probability values.

11. The method of claim 1, wherein the probability value of the current network communication is 1 if it meets the threshold criteria and the probability value is unchanged if it fails to meet the threshold criteria.

12. The method of claim 1, wherein the current network communication is rejected when the probability of the current network communication is below the threshold probability value.

13. The method of claim 1, wherein the plurality of successive network communication attributes and the plurality of current network communication attributes are mutually exclusive.

14. The method of claim 1, wherein the probability value of the current network communication is a multiplication of the probability values of the plurality of attributes of the current network communication.

15. A computer-implemented method of adapting to changed conditions and analyzing network traffic related to a web application in a network application system to detect and prevent attacks on the network application system, where one or more processors are programmed to perform steps comprising:
developing a profile of acceptable behavior for network communication for transmission over a network, the profile of acceptable behavior including probability values of network communication parameters developed from a collection of historical network communication;
receiving a current network communication, the current network communication including multiple current network communication parameters, each of the current network communication parameters independent of each other;
assigning an updateable probability value indicative of each of the current network communication parameters, the updateable probability value based on a comparison of each of the current network communication parameters against the profile of acceptable behavior;
determining the probability value of the current network communication by a calculation comprising the updateable probability value of each of the current network communication parameters;
validating the current network communication against the profile of acceptable behavior based upon whether or not the probability value of the current network communication meets a threshold criteria;
updating the probability values of historical network communication parameters in the profile of acceptable behavior; and
triggering a responsive action based on the result of the validation.

16. The method of claim 15, further comprising:
storing the multiple current network communication parameters of the current network communication in a buffer until enough information has been accumulated for each of the network communication parameters to be statistically valid.

17. The method of claim 16, wherein the current network communication parameter is determined to be statistically valid based on one of time since the collection of the current network communication parameter started, number of network communication including current network communication parameter and the diversity of the current network communication.

18. The method of claim 15, further comprising:
merging the current network communication to the profile of acceptable behavior when the current network communication meets the threshold criteria.

19. The method of claim 15, further comprising:
triggering an alert when the current network communication fails to meet the threshold criteria.

20. The method of claim 15, further comprising:
forwarding the current network communication to an administrator for further analysis when the current network communication fails to meet the threshold criteria.

21. The method of claim 15, wherein the threshold probability criteria is based on a threshold probability value.

22. The method of claim 21, further comprising:
generating different threshold probability values depending on the severity of the variation from the profile of acceptable behavior.

23. The method of claim 21, wherein the probability value of the current network communication is 1 if it is above the threshold probability value and the probability value is unchanged if it is below the threshold probability value.

24. The method of claim 21, wherein the threshold probability value comprises a range of probability values.

25. The method of claim 21, wherein the current network communication is rejected when the current network communication is below the threshold probability value.

26. The method of claim 15, wherein the multiple current network communication parameters of the current network communication are mutually exclusive.

27. The method of claim 15, wherein the probability value of the current network communication is a multiplication of the probability value of each current network communication parameter of the current network communication.

28. The method of claim 15, wherein the probability value of the network communication is the weighted average of probabilities of the multiple current network communication parameters.

29. A system for adapting to changed conditions and analyzing network traffic in a network application system comprising:
a non-transitory computer readable medium configured to store computer executable programmed modules;
a processor communicatively coupled with the non-transitory computer readable medium configured to execute programmed modules stored therein;
a dynamic profiling module stored in the non-transitory computer readable medium and configured to develop a profile of acceptable behavior for network communication for transmission over a network, the profile of acceptable behavior including probability values of network communication parameters developed from a collection of historical network communication; and
a control module stored in the non-transitory computer readable medium and configured to receive a current network communication, the current network communication including multiple current network communication parameters, each of the current network communication parameters independent of each other,
wherein the control module is configured
to assign an updateable probability value indicative of each of the current network communication parameters, the updateable probability value based on a comparison of each of the current network communication parameters against the profile of acceptable behavior,
to determine probability value of the current network communication by a calculation comprising the updateable probability value of each of the current network communication parameters,
to validate the current network communication against the profile of acceptable behavior based upon the probability value of the current network communication and a threshold criteria, to update the probability values of historical network communication parameters in the profile of acceptable behavior, and to trigger a responsive action based on the result of the validation.

30. The system of claim 29, further comprising:
a buffer configured to store the multiple current network communication parameters of the current network communication in a buffer until enough information has been accumulated for each of the network communication parameters to be statistically valid.

31. The system of claim 30, wherein the current network communication parameter is determined to be statistically valid based on one of time since the collection of the current network communication parameter started, number of network communication including current network communication parameter and the diversity of the current network communication.

32. The system of claim 29, further comprising:
an adaptation module configured to merge the current network communication to the profile of acceptable behavior when the current network communication meets the threshold criteria.

33. The system of claim 29, wherein the control module is further configured to trigger an alert when the current network communication fails to meet the threshold criteria.

34. The system of claim 29, wherein the control module is further configured to forward the current network communication to an administrator for further analysis when the current network communication fails to meet the threshold criteria.

35. The system of claim 29, further comprising:
a correlation and analysis module configured to analyze the current network communication to determine the security risk of the current network communication when the current network communication fails to meet the threshold criteria.

* * * * *